(12) United States Patent
Kimura et al.

(10) Patent No.: US 11,601,558 B2
(45) Date of Patent: Mar. 7, 2023

(54) INFORMATION PROCESSING APPARATUS, METHOD FOR CONTROLLING INFORMATION PROCESSING APPARATUS, AND NON-TRANSITORY COMPUTER READABLE MEDIUM

(71) Applicant: CANON KABUSHIKI KAISHA, Tokyo (JP)

(72) Inventors: Yusuke Kimura, Kokubunji (JP); Nobuhiro Kawamura, Nagareyama (JP); Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/825,464

(22) Filed: Mar. 20, 2020

(65) Prior Publication Data
US 2020/0314268 A1   Oct. 1, 2020

(30) Foreign Application Priority Data

Mar. 29, 2019   (JP) .............................. JP2019-068839

(51) Int. Cl.
*H04N 1/00*   (2006.01)
(52) U.S. Cl.
CPC ....... *H04N 1/00482* (2013.01); *H04N 1/0044* (2013.01); *H04N 1/00694* (2013.01); *H04N 1/00708* (2013.01)
(58) Field of Classification Search
CPC ............. H04N 1/00482; H04N 1/0044; H04N 1/00694; H04N 1/00708
USPC ....................................... 358/1.18, 1.15, 1.9
See application file for complete search history.

(56) References Cited

U.S. PATENT DOCUMENTS

| | | | | |
|---|---|---|---|---|
| 2004/0207859 A1* | 10/2004 | Kadoi | .................. | H04N 1/3873 715/251 |
| 2012/0075650 A1* | 3/2012 | Tani | .................... | H04N 1/00424 358/1.13 |
| 2012/0131452 A1* | 5/2012 | Ogino | ................. | G06F 3/04883 715/274 |

(Continued)

FOREIGN PATENT DOCUMENTS

| | | |
|---|---|---|
| JP | 2012-183767 A | 9/2012 |
| JP | 2018-86766 A | 6/2018 |

OTHER PUBLICATIONS

OCE-Technologies B.V.; "OCE User Manual;" Venio, The Netherlands, Nov. 2009, pp. 1-273.

*Primary Examiner* — Quang N Vo
(74) *Attorney, Agent, or Firm* — Canon U.S.A., Inc. IP Division

(57) ABSTRACT

An information processing apparatus connected to an image forming apparatus includes a display control unit configured to perform control for displaying at least a predetermined image in a predetermined display region and shifting a display position of the predetermined image displayed in the display region in accordance with a command from a user, a setting unit configured to set a value used for adjusting a position where the image forming apparatus prints an image onto a recording medium based on the display position of the predetermined image in the display region, and a transmitting unit configured to transmit the value set by the setting unit to the image forming apparatus.

30 Claims, 19 Drawing Sheets

(56) References Cited

U.S. PATENT DOCUMENTS

2013/0050726 A1* 2/2013 Ogawa .............. H04N 1/00973
358/1.13
2018/0181042 A1 6/2018 Ooba

* cited by examiner

| SHEET NAME | SHEET ID | SIZE | BASIS WEIGHT | SHIFT AMOUNT e FROM LEADING EDGE (FIRST FACE) | SHIFT AMOUNT i FROM LEFT EDGE (FIRST FACE) | SHIFT AMOUNT e FROM LEADING EDGE (SECOND FACE) | SHIFT AMOUNT i FROM LEFT EDGE (SECOND FACE) | SETTABLE FEED-TRAY ID |
|---|---|---|---|---|---|---|---|---|
| 08_Mohawk Color Co… | 1 | A3 | 120 | 0 | 0 | 0 | 0 | 1, 2, 3, 4, 5 |
| 09_International Paper… | 2 | A4 | 200 | 10.0 | -10.0 | 10.0 | -10.0 | 1, 2, 3, 4, 5 |
| 10_Avery Glossy W… | 3 | A4 | 165 | 7 | 2.5 | 0 | 0 | 4, 5 |
| … | … | … | … | … | … | … | … | … |

410

| FEED-TRAY NAME | FEED-TRAY ID | SHEET ID | REMAINING NUMBER OF SHEETS |
|---|---|---|---|
| SHEET CASSETTE 1 | 1 | 1 | 100 |
| SHEET CASSETTE 2 | 2 | 1 | 25 |
| SHEET CASSETTE 3 | 3 | 2 | 25 |
| SHEET CASSETTE 4 | 4 | 1 | 25 |
| MANUAL FEED TRAY | 5 | 0 | 0 |

FIG. 6

SHEET CASSETTE 1 — 600

SHEET LIST: DISPLAY ALL | SEARCH FOR SHEET

| NAME | BASIS WEIGHT | SIZE | Y (WIDTH) | X |
|---|---|---|---|---|
| 08_Mohawk Color Copy Pre... | 120 | A3 | 297.0 | 42 |
| 09_International Paper Spri... | 200 | A4 | 297.0 | 21 |
| 10_Avery Glossy White Pac... | 91 | A4 | 297.0 | 21 |
| 11_Mohawk Options i-Tone... | 165 | A4 | 297.0 | 21 |
| 12_Sappi Opus Gloss Digita... | 216 | A4 | 297.0 | 21 |
| 13_Canon USA Coated Two... | 216 | A4 | 297.0 | 21 |
| 14_Sappi Opus Gloss Digita... | 270 | A4 | 297.0 | 21 |
| 15_Canon USA Coated 2 si... | 216 | A4 | 297.0 | 21 |
| 16_Boise Aspen 30% Recyc... | 75 | A4 | 297.0 | 21 |
| 17_Mohawk Color Copy 100... | 105 | A4 | 297.0 | 21 |
| 2 | 90 | A4 | 297.0 | 21 |
| 200x300 | 100 | USER-DESIGNATED SIZE | 200.0 | 30 |
| 3 | 90 | A4 | 297.0 | 21 |
| 30_Mohawk Color Copy Pre... | 105 | LTR | 279.4 | 21 |
| 30_Mohawk Color Copy Pre... | 105 | LTR | 279.4 | 21 |
| 31_International Paper Ha... | 90 | A4 | 297.0 | 21 |
| 35_International Paper Ha... | 75 | A4 | 297.0 | 21 |
| 4 | 90 | A4 | 297.0 | 21 |
| 40_Canon USA Coated 2 si... | 216 | A4 | 297.0 | 21 |
| 47_International Paper Col... | 162 | A4 | 297.0 | 21 |
| 5 | 90 | A4 | 297.0 | 21 |
| 555555555 | 90 | A4 | 297.0 | 21 |
| 6 | 90 | A4 | 297.0 | 21 |
| 7 | 90 | A4 | 297.0 | 21 |

SHEET INFORMATION — 601

NAME:
08_Mohawk Color Copy Premium Neon White(32 Lb, Bond)

IMAGE POSITION ADJUSTMENT:
YES [ADJUST...]

SECONDARY TRANSFER VOLTAGE ADJUSTMENT:
YES [ADJUST...]

CURL CORRECTION AMOUNT:
NO [ADJUST...]

GLOSSINESS/BLACK-QUALITY ADJUSTMENT:
NO [ADJUST...]

TRAILING-EDGE WHITE-VOID CORRECTION:
NO [ADJUST...]

SADDLE-STITCH SETTING:
YES [ADJUST...]

SHEET-FAN AIR VOLUME ADJUSTMENT:
YES [ADJUST...]

[ADVANCED SETTINGS...] — 602

[OK] [CANCEL] — 603

INFORMATION PROCESSING APPARATUS, METHOD FOR CONTROLLING INFORMATION PROCESSING APPARATUS, AND NON-TRANSITORY COMPUTER READABLE MEDIUM

BACKGROUND OF THE INVENTION

Field of the Invention

The present invention relates to information processing apparatuses for managing sheet information used in printing, methods for controlling information processing apparatuses, and programs.

Description of the Related Art

In the related art, it is known to adjust an image position by remotely accessing an image forming apparatus from an application that performs sheet management and operates in a print control apparatus or a client computer connected to the image forming apparatus (see Japanese Patent Laid-Open No. 2018-86766). An operator gives a command for outputting a test page from this application. The operator ascertains a displacement of the image position by viewing a print result of a specific section of the output test page or by measuring the displacement, and performs an adjustment by inputting an adjustment value for correcting the displacement amount from the application or from an operable unit of the image forming apparatus.

Furthermore, a known method in the related art involves printing a ruled line onto a sheet having a predetermined mark preliminarily printed thereon, and determining a displacement of the image position during the printing based on the positional relationship between the predetermined mark and the printed ruled line (see Japanese Patent Laid-Open No. 2012-183767). Japanese Patent Laid-Open No. 2012-183767 discloses that a user measures the distance between the predetermined mark and the ruled line by using a ruler and adjusts the displacement of the image position based on the measurement result. Japanese Patent Laid-Open No. 2012-183767 also discloses a method that involves giving numbers to a plurality of ruled lines and allowing the user to visually check whether the ruled line corresponding to any of the given numbers is aligned with a reference position. In this method, a correction amount is set when the user inputs the number of the ruled line aligned with the reference position to the image forming apparatus.

In the methods in the related art, special knowledge and skills are necessary for adjusting the position where an image is to be printed onto a sheet. For example, in the method that involves the operator checking the displacement amount by using a ruler, it is difficult for the operator to know how the measurement location of the test page and the measurement result are to be input to the apparatus. Thus, it is difficult for an untrained operator to perform the adjustment.

With regard to the method that involves inputting the number of the ruled line aligned with the reference position, it is similarly difficult for an untrained operator to know which of the numbers to input. For example, it is difficult for the operator to know whether to input the number of a ruled line completely included in the reference position or to input the number of a ruled line that is in contact with the reference position.

SUMMARY OF THE INVENTION

The present invention allows a user to adjust a print position of an image more easily.

An information processing apparatus according to an embodiment below has the following configuration. Specifically, the information processing apparatus is connected to an image forming apparatus and includes a display control unit configured to perform control for displaying at least a predetermined image in a predetermined display region and shifting a display position of the predetermined image displayed in the display region in accordance with a command from a user, a setting unit configured to set a value used for adjusting a position where the image forming apparatus prints an image onto a recording medium based on the display position of the predetermined image in the display region, and a transmitting unit configured to transmit the value set by the setting unit to the image forming apparatus.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 4 illustrates an example of a setting value table according to an embodiment.

FIG. 6 illustrates an example of a screen according to the embodiment.

DESCRIPTION OF THE EMBODIMENTS

First Embodiment

Figure 1:
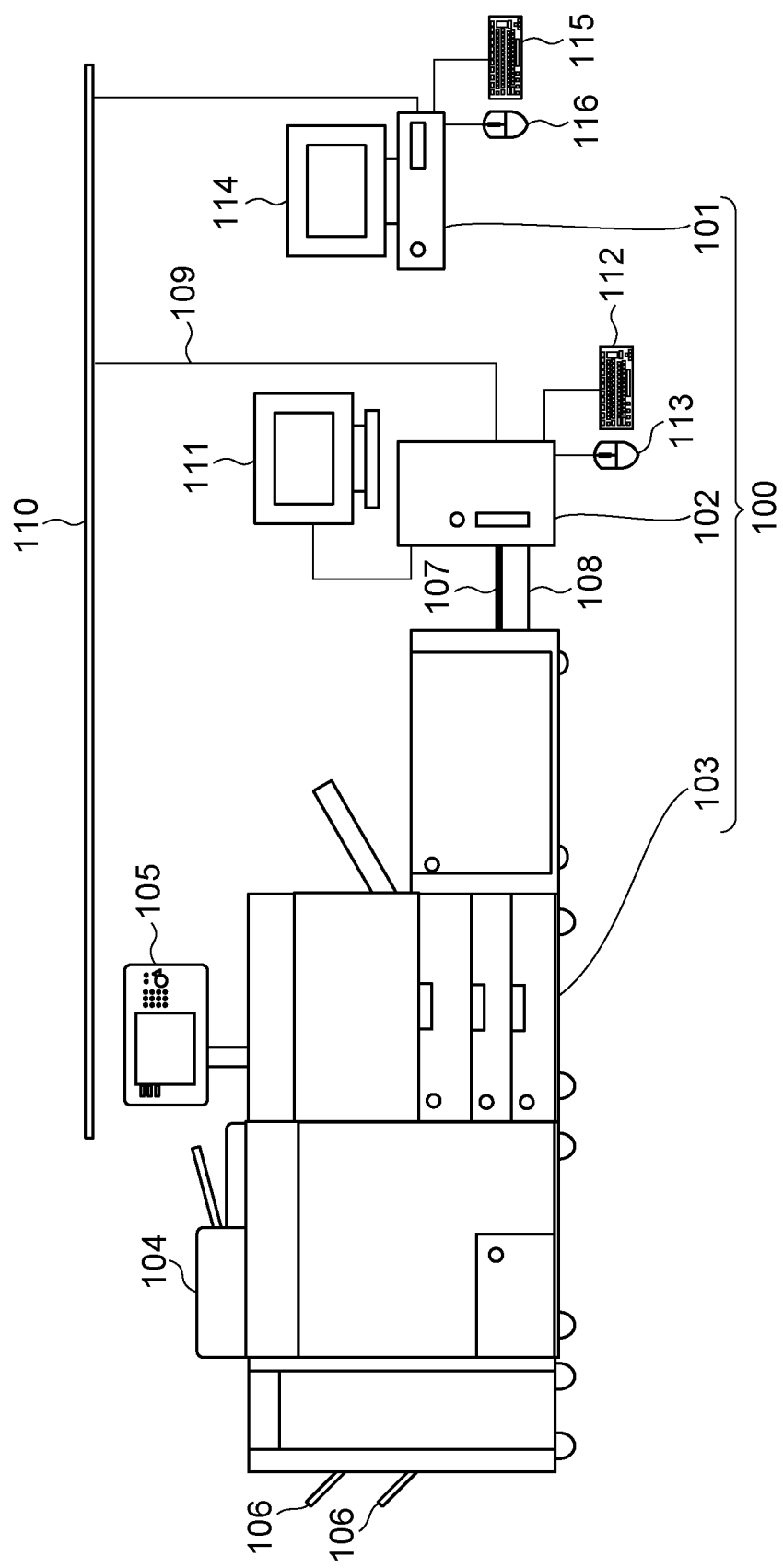
FIG. 1 is a block diagram illustrating a configuration example of a sheet management system.

FIG. 1 illustrates an overall configuration example of a sheet management system 100 according to a first embodiment. The sheet management system 100 in FIG. 1 includes a client computer 101, a print control apparatus 102 as an information processing apparatus, and an image forming apparatus 103. The sheet management system 100 is connected to the client computer 101 in a communicable manner. The client computer 101 and the print control apparatus 102 are connected in a communicable manner by an Ethernet (registered trademark) cable 109 via a local area network (LAN) 110. The print control apparatus 102 and the image forming apparatus 103 are connected by an image video cable 107 and a control cable 108. In this embodiment, the image forming apparatus 103 is not directly connected to the LAN 110. The image forming apparatus 103 and the client computer 101 communicate with each other via the print control apparatus 102. Alternatively, the image forming apparatus 103 may be connected to the LAN 110. In other words, the image forming apparatus 103 may be directly connected to the client computer 101 in a communicable manner.

The client computer 101 activates an application to operate the sheet management system 100, and also gives a print command from a print driver. The print control apparatus 102 activates an application to operate the sheet management system 100, and also performs image processing in cooperation with the image forming apparatus 103. The image forming apparatus 103 is, for example, a multifunction apparatus that not only performs image processing from the client computer 101 or the print control apparatus 102, but also copies data read by a scanner unit 104 or transmits the data to a shared folder. When an image is to be scanned by the scanner unit 104, various types of commands are received from a user via various types of keys at an operation unit 105. The operation unit 105 also displays various kinds of information, such as a scanning status, via a screen. A sheet discharging unit 106 receives a sheet having an image formed thereon, and discharges the received sheet. Reference numeral 111 denotes a display device, such as a liquid crystal monitor, of the print control apparatus 102. Reference numeral 112 denotes a keyboard of the print control apparatus 102, and reference numeral 113 denotes a pointing device of the print control apparatus 102. Reference numeral 114 denotes a display device, such as a liquid crystal monitor, of the client computer 101. Reference numeral 115 denotes a keyboard of the client computer 101, and reference numeral 116 denotes a pointing device of the client computer 101.

With regard to the sheet management system 100 described in this embodiment, the client computer 101 or the print control apparatus 102 is a separate system from the image forming apparatus 103. However, the processing of the client computer 101 or the print control apparatus 102 may be incorporated in the image forming apparatus 103, such that the client computer 101 or the print control apparatus 102 does not have to be physically disposed. Moreover, the display device 111 may be like a touchpad and be configured to have both a function for receiving positional information based on the position manually designated on the touchpad by the user and a function of the pointing device 113.

Image Forming Apparatus

Figure 2A:
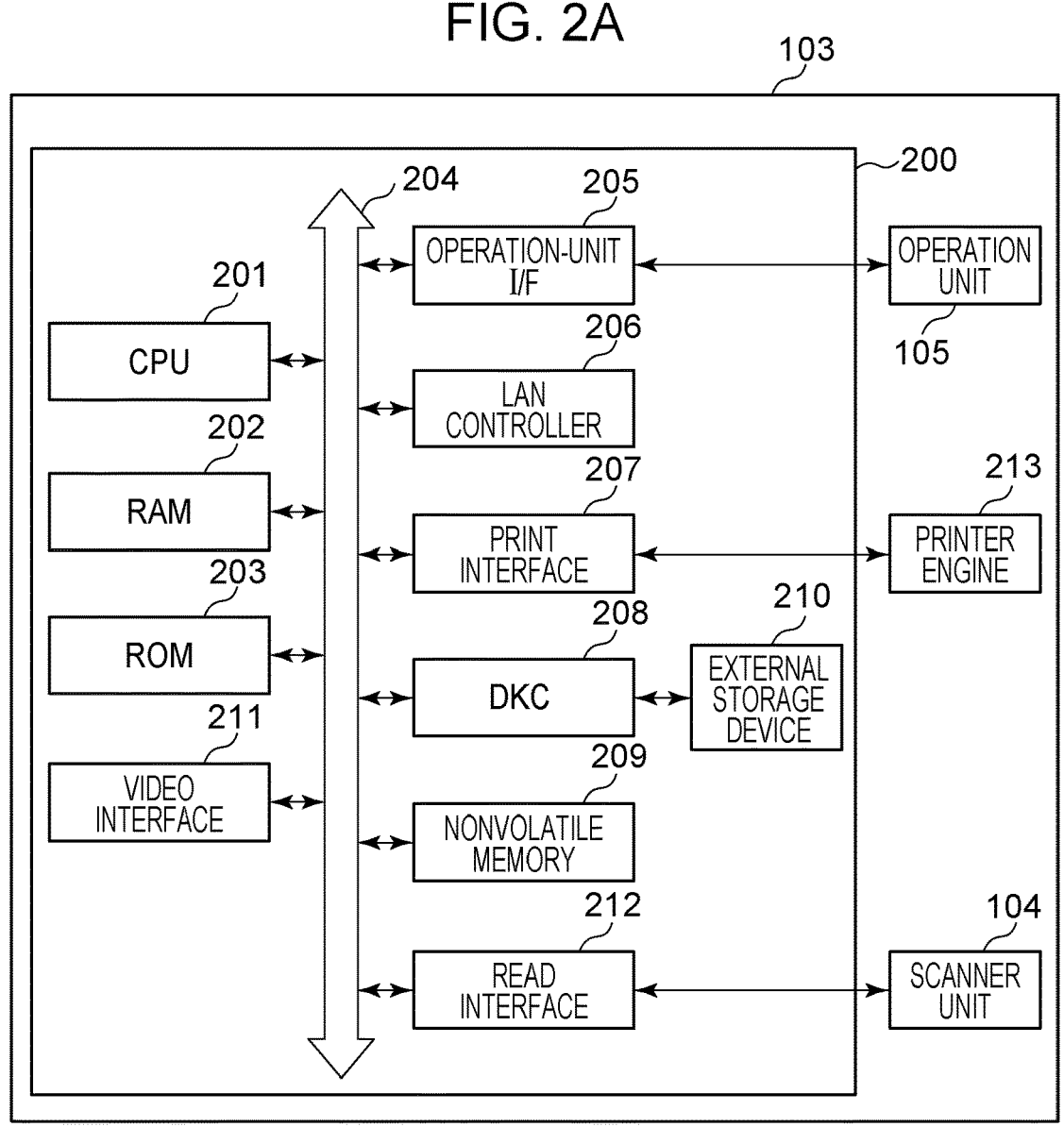
FIGS. 2A and 2B are block diagrams illustrating a hardware configuration and a software configuration of an image forming apparatus.

FIG. 2A is a block diagram illustrating a hardware configuration of the image forming apparatus 103. In the block diagram of the image forming apparatus 103 in FIG. 2A, a controller 200 controls the image forming apparatus 103 and includes components ranging from a central processing unit (CPU) 201 to a read interface 212. The CPU 201 performs overall control of access to various types of devices connected to a system bus 204 based on a control program stored in a read-only memory (ROM) 203 or an external storage device 210. The CPU 201 also outputs an image signal as output information to a printer unit (printer engine) 213 connected via a print interface 207, and controls an image signal input from the scanner unit 104 connected via the read interface 212. The CPU 201 is communicable with the print control apparatus 102 via a LAN controller 206. Reference numeral 202 denotes a random access memory (RAM) that mainly functions as a main memory or a work area for the CPU 201. The external storage device 210, such as a hard disk drive (HDD) or an integrated-circuit (IC) card, is access-controlled by a disk controller (DKC) 208. A hard disk drive is used as a job storage area for storing, for example, an application program, font data, and form data, temporarily spooling a print job, and controlling the spooled job from the outside. In this embodiment, an example where an HDD is used as the external storage device 210 will be explained. Reference numeral 205 denotes an operation-unit interface (I/F) that receives various types of information input by the user from the operation unit 105 (such as software keys or hardware keys) and that transmits various types of screen display control signals. Reference numeral 209 denotes a nonvolatile memory that stores therein various types of setting information set from a terminal via the operation unit 105 or a network. A video interface 211 receives image data from the print control apparatus 102.

Figure 2B:
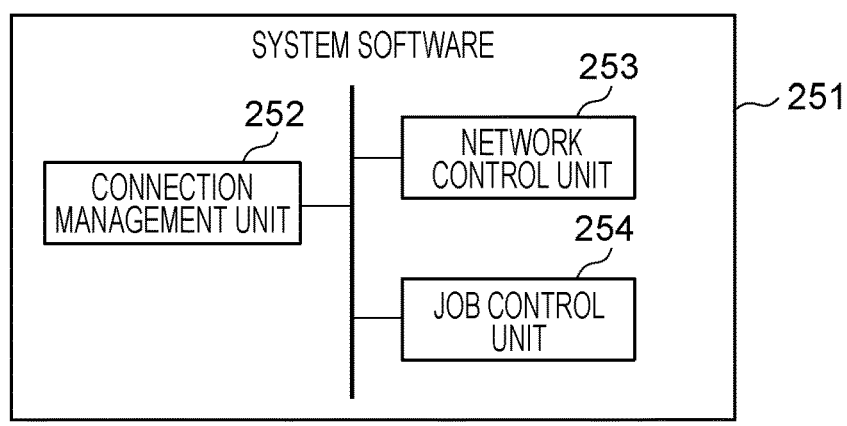

FIG. 2B is a block diagram illustrating a software configuration of the image forming apparatus 103. System software 251 that controls the image forming apparatus 103 is constituted of a connection management unit 252, a network control unit 253, and a job control unit 254.

The connection management unit 252 controls connection management between an application and the image forming apparatus 103 in the client computer 101 or the print control apparatus 102. The connection management unit 252 is capable of managing the number of connected applications and exchanging data with the client computer 101 or the print control apparatus 102.

The network control unit 253 controls a communication process with the print control apparatus 102 via the LAN controller 206.

The job control unit 254 performs print control including controlling the printing sequence and the order of jobs.

Print Control Apparatus

Figure 3A:
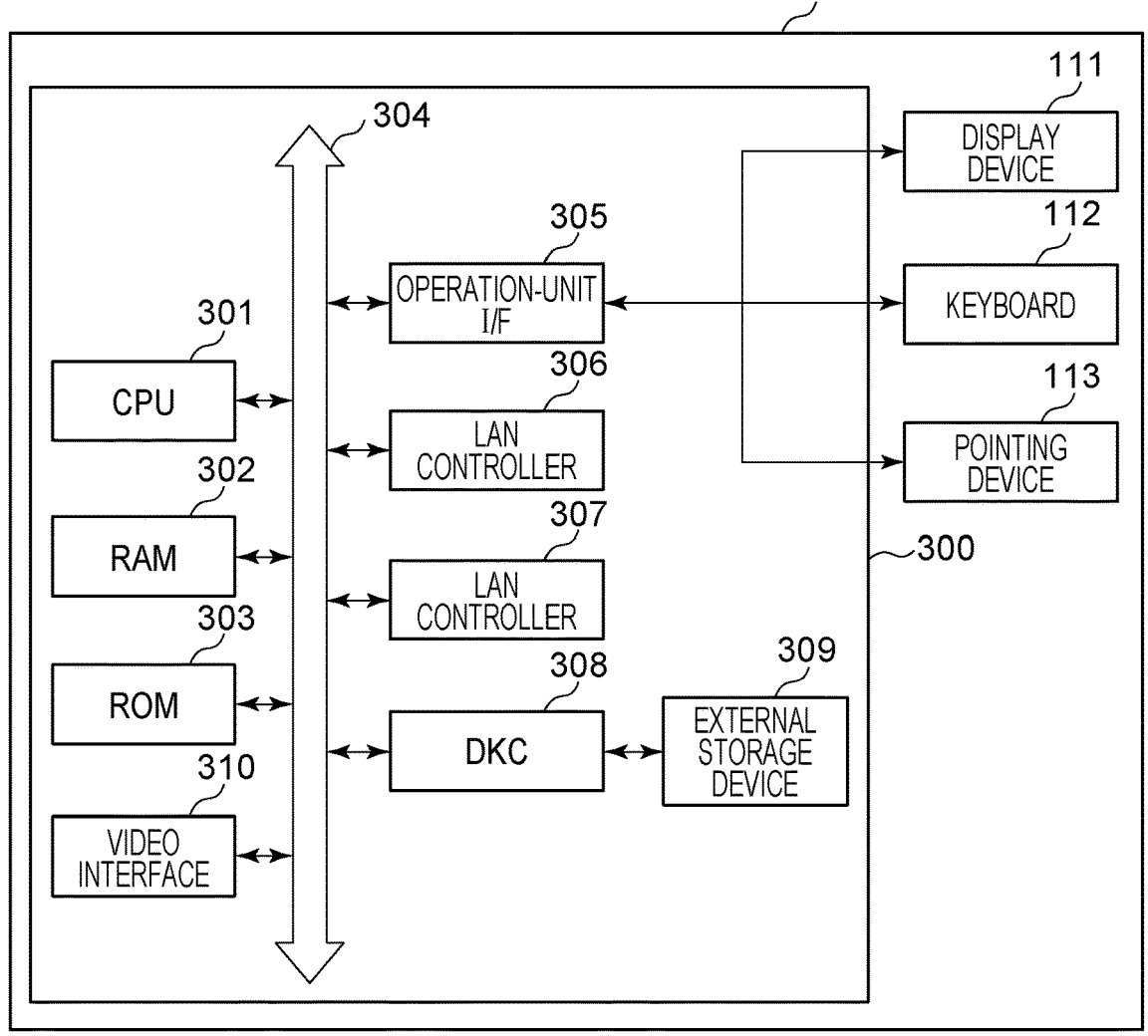
FIGS. 3A and 3B are block diagrams illustrating a hardware configuration and a software configuration of a print control apparatus.

FIG. 3A is a block diagram illustrating a hardware configuration of the print control apparatus 102. In the block diagram of the print control apparatus 102 in FIG. 3A, a controller 300 controls the print control apparatus 102 and is constituted of components ranging from a CPU 301 to a video interface 310. The CPU 301 performs overall control of access to various types of devices connected to a system bus 304 based on a control program stored in a ROM 303 or an external storage device 309. The CPU 301 is communicable with the image forming apparatus 103 via a LAN controller 306. The CPU 301 is communicable with the image forming apparatus 103 and the client computer 101 in the network via a LAN controller 307. Reference numeral 302 denotes a RAM that mainly functions as a main memory or a work area for the CPU 301. The external storage device 309, such as an HDD or an IC card, is access-controlled by a disk controller (DKC) 308. A hard disk drive is used as a job storage area for storing, for example, an application program, font data, and form data, temporarily spooling a print job, performing raster image processing (RIP) on the spooled job, and storing the processed job again. Reference numeral 305 denotes an operation-unit interface (I/F) that receives various types of information input by the user from an operation unit (such as the keyboard 112 or the pointing device 113) and that transmits various types of screen display control signals to the display device 111. The video interface 310 transmits RIP-processed image data to the image forming apparatus 103.

Figure 3B:
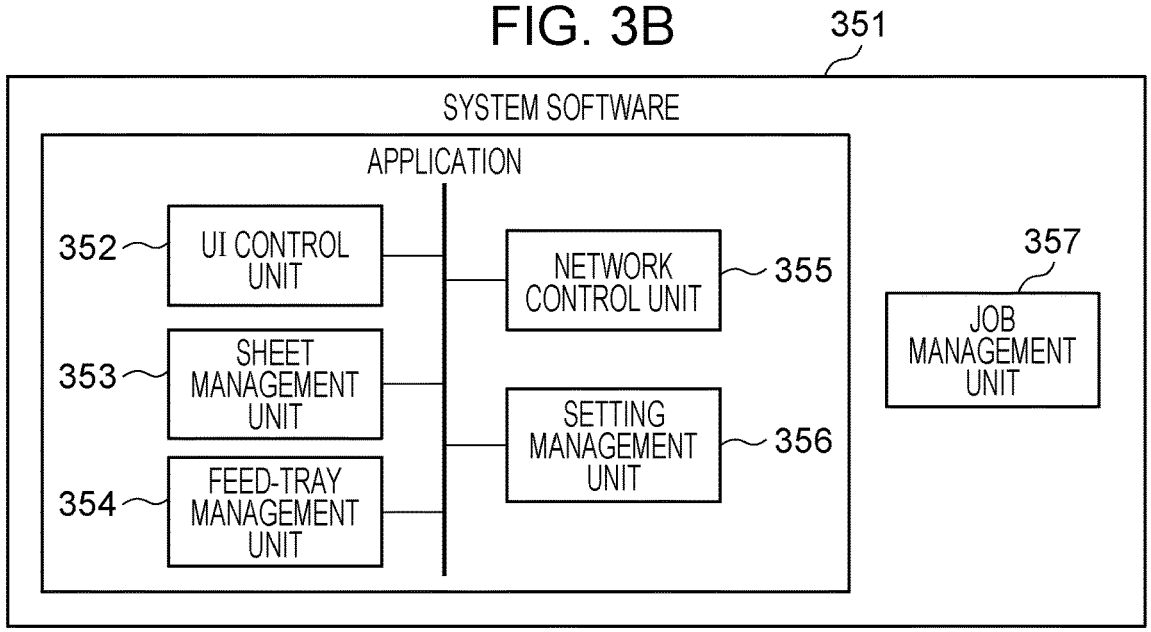

FIG. 3B is a block diagram illustrating a software configuration of the print control apparatus 102. System software 351 that controls the print control apparatus 102 is constituted of a sheet management application and a job management unit 357.

The sheet management application is constituted of a UI control unit 352, a sheet management unit 353, a feed-tray management unit 354, a network control unit 355, and a setting management unit 356.

The UI control unit 352 controls a screen to be displayed in the sheet management system 100. The UI control unit 352 is capable of performing control to change a screen display message and the unit of display for the sheet size in accordance with system settings.

The sheet management unit 353 communicates with the image forming apparatus 103 to manage acquired sheet information on a sheet-setting management table 400 in FIG. 4. The sheet management unit 353 is capable of performing editing, adding, deleting, and searching processes with respect to the sheet information on the sheet-setting management table 400. The sheet-setting management table 400 is used for managing the sheet information for each sheet ID and is managed by the external storage device 309 serving as a nonvolatile area.

The feed-tray management unit 354 communicates with the image forming apparatus 103 to manage acquired feed-tray information on a feed-tray-setting management table 410 in FIG. 4. The feed-tray management unit 354 is capable of performing editing, adding, deleting, and searching processes with respect to the feed-tray information on the feed-tray-setting management table 410. The feed-tray-setting management table 410 is used for managing the feed-tray information for each feed-tray ID and is managed by the external storage device 309 serving as a nonvolatile area.

The network control unit 355 controls a communication process with the image forming apparatus 103 via the LAN controller 306 and with the client computer 101 in the network via the LAN controller 307. The network control unit 355 controls a communication process for exchanging an operation command of the sheet management system 100, received by the client computer 101 via the LAN controller 307, with the image forming apparatus 103 via the LAN controller 306.

The setting management unit 356 manages the system settings related to the sheet management system 100. The system settings include, for example, a language setting for a screen display message of the sheet management system 100 and a display-unit-related setting for the sheet size (in millimeters or inches), and are managed by the external storage device 309 serving as a nonvolatile area.

The job management unit 357 manages the printing sequence and the order of jobs. The job management unit 357 manages a page-description language (PDL) data received as a job by the print control apparatus 102, performs RIP on the data, and generates raster image data readable by the image forming apparatus 103. The job management unit 357 analyzes a print command contained in the PDL data and creates print setting information to be used in a printing process. The job management unit 357 forwards the image data and the print setting information to be used in the printing process to the image forming apparatus 103 via the LAN controller 306 and the video interface 310.

Display Screen of Feed-Tray Information

Figure 5:
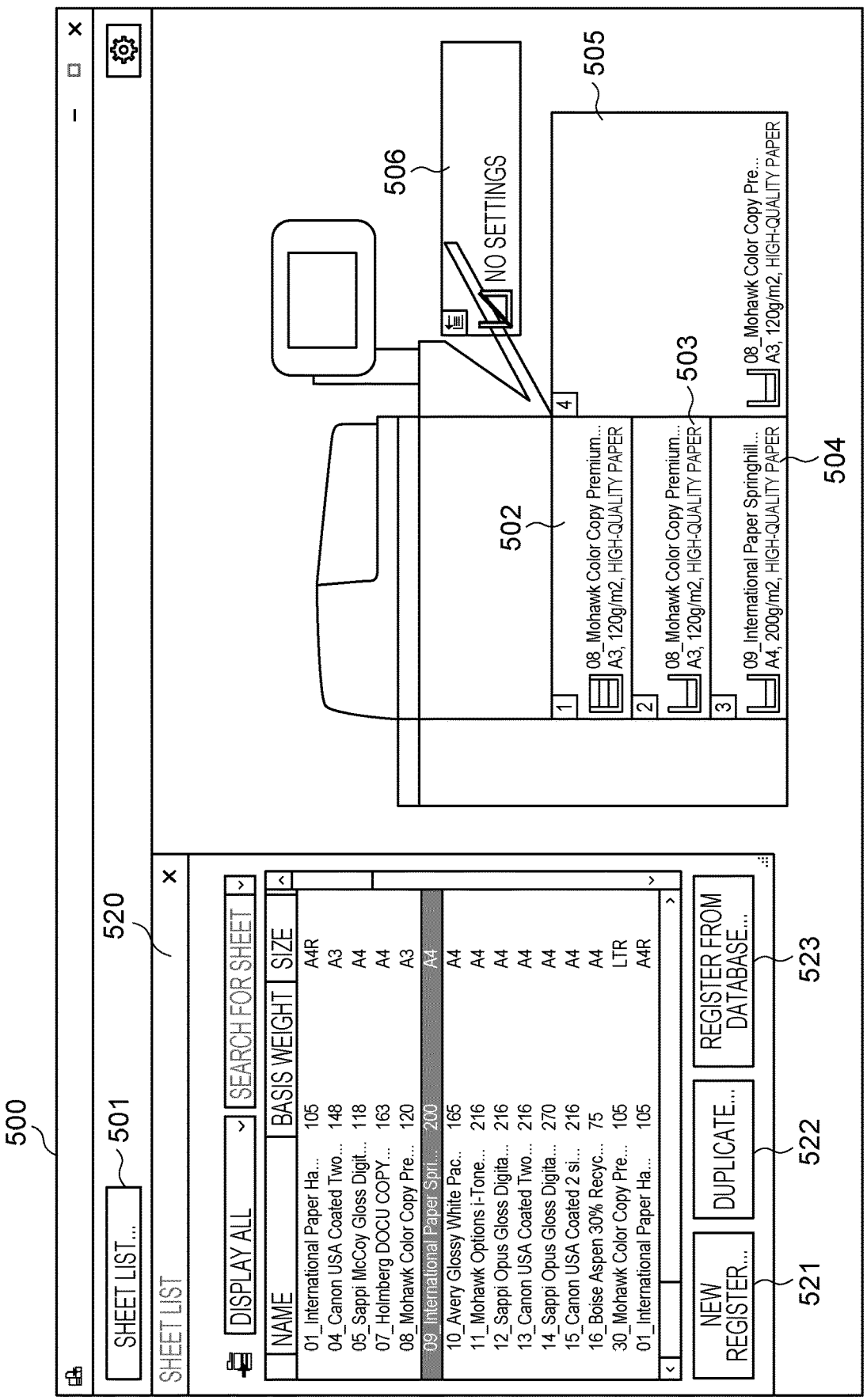
FIG. 5 illustrates an example of a screen according to the embodiment.

FIG. 5 is a screen example of the sheet management system 100. The sheet management system 100 operates in the print control apparatus 102. A top screen 500 in FIG. 5 displays information about feed trays in the image forming apparatus 103. The top screen 500 of the sheet management system 100 renders an image in a video memory in accordance with a command from the CPU 301, and outputs image data rendered in the RAM 302 as a video signal to the display device 111 where the image is displayed.

The top screen 500 shows the connection statuses of hardware options, which are connected to the print control apparatus 102, of the image forming apparatus 103. When the sheet management system 100 is activated, information about the hardware options of the image forming apparatus 103 is acquired, and a proper image is displayed in accordance with this option information. FIG. 5 according to this embodiment illustrates a state where five sheet feeders (one of which is a manual feed tray) and a sheet discharger are connected.

A sheet list button 501 is used for giving a command for displaying a sheet list screen. In this embodiment, when the sheet list button 501 is pressed, the controller 300 of the print control apparatus 102 displays a sheet list screen 520 in FIG. 5, such that the sheet list screen 520 is displayed at the front.

Reference numeral 502 to reference numeral 506 each denote a feed-tray button. The feed-tray buttons 502 to 506 are created and arranged based on feed-tray information of the image forming apparatus 103 acquired when the sheet management system 100 is activated. In a case where the status of a feed tray in the image forming apparatus 103 changes, if a feed-tray-status changing event is received from the image forming apparatus 103, the controller 300 of the print control apparatus 102 acquires the feed-tray information again. When the feed-tray button 502 for a sheet cassette 1 is pressed by using, for example, the pointing device 113, a setting screen 600 for the sheet cassette 1 shown in FIG. 6 is displayed.

Sheet List Screen

The sheet list screen 520 in FIG. 5 will now be described. The sheet list screen 520 displays a sheet list and is an operable screen used for drafting, duplicating, deleting, and changing the settings of a sheet, and also for registering a selected sheet to a feed tray.

The sheet list screen 520 renders an image in the RAM 302 in accordance with a command from the CPU 301, and also outputs image data rendered in the RAM 302 as a video signal to the display device 111 where the image is displayed. In the sheet list screen 520, a pull-down menu for selecting a sheet-list display region and a sheet-list display method, a sheet search input area, and sheet add buttons used for adding sheets to the sheet list are displayed. The sheet add buttons displayed include a new register button 521 used for registering a new sheet to the sheet list, a duplicate button 522 used for duplicating an already-existing sheet to the sheet list, and a register-from-database button 523 used for drafting a sheet from a sheet database.

The sheet-list display region is a table that displays the sheet list. In the table, the rows have sheet information set therein, and the columns have sheets set therein. When a sheet is selected and right-clicked, a sheet registration context menu is displayed. By selecting a registerable feed tray from the menu, the selected sheet can be registered. If a delete key is pressed in a state where a sheet is selected, the selected sheet can be deleted from the sheet list.

Feed-Tray Setting Screen

The setting screen 600 for the sheet cassette 1 in FIG. 6 will now be described. The setting screen 600 renders an image in the RAM 302 in accordance with a command from the CPU 301, and also outputs image data rendered in the RAM 302 as a video signal to the display device 111 where the image is displayed. In the setting screen 600, buttons (such as an image-position adjustment button 601) used for displaying a sheet-list display region and adjustment screens for main adjustment items, a button 602 used for displaying a setting screen for other non-displayed sheet information, an OK button 603, and a cancel button 604 are displayed. With regard to a sheet-list display method, a pull-down menu and a sheet search input area similar to those in the sheet list screen 520 are displayed.

When the setting screen 600 is displayed, a sheet set in a feed tray is in a selected state in the sheet-list display region. When a sheet is selected in the sheet-list display region and the OK button 603 is pressed, the controller 300 performs a sheet setting process on the image forming apparatus 103. When a sheet is selected in the sheet-list display region and the cancel button 604 is pressed, the controller 300 closes the setting screen 600 without performing a sheet setting process on the image forming apparatus 103. When the feed-tray button 502 in the top screen 500 in FIG. 5 is pressed to open the setting screen 600, information about a sheet currently allocated to the sheet cassette 1 is displayed.

For improved convenience for the operator, the setting screen 600 in this embodiment only displays, for example, sheet information frequently used by the operator. In detail, sheet names and various adjustment items (i.e., image position adjustment, secondary transfer voltage adjustment, curl correction amount, glossiness/black-quality adjustment, trailing-edge white-void correction, saddle-stitch setting, and sheet-fan air volume adjustment) are displayed.

An image position adjustment is an item for adjusting the position where the image forming apparatus 103 forms an image onto a recording medium (i.e., a sheet). In this embodiment, the image position adjustment involves adjusting the image position for each of first and second faces of a page. Furthermore, in this embodiment, an amount of increase or decrease in the length from the lower edge of a sheet to an image rendering region (sometimes expressed as "a shift amount from the lower edge") may be set as an image-position adjustment value. Alternatively, in this embodiment, an amount of increase or decrease in the length from the left edge of a sheet to an image rendering region (sometimes expressed as "a shift amount from the left edge") may be set as an image-position adjustment value. The lower edge of a sheet in this embodiment refers to the trailing edge of the sheet in the sheet conveying direction (i.e., the upstream edge in the sheet conveying direction). The left edge of a sheet in this embodiment refers to the left edge of the sheet when oriented in the sheet conveying direction. Alternatively, the length to the image rendering region from the leading edge of a sheet in the sheet conveying direction (i.e., the downstream edge in the sheet conveying direction) or the right edge of the sheet when oriented in the sheet conveying direction may be set. Moreover, instead of designating the adjustment amount (i.e., the amount of increase or decrease), the width (i.e., an absolute value) may be designated. The manner of how an adjustment value is designated is not particularly limited.

The setting screen 600 displays a currently-selected sheet name and whether or not each adjustment value has been changed from an initial value of the image forming apparatus 103. If there are no changes, a message "no" is displayed. If there are changes, a message "yes" is displayed. With regard to items adjustable from the print control apparatus 102, buttons are displayed as in the image-position adjustment button 601, such that corresponding adjustment screens are displayable.

Image-Position Adjustment Screen

Figure 7A:
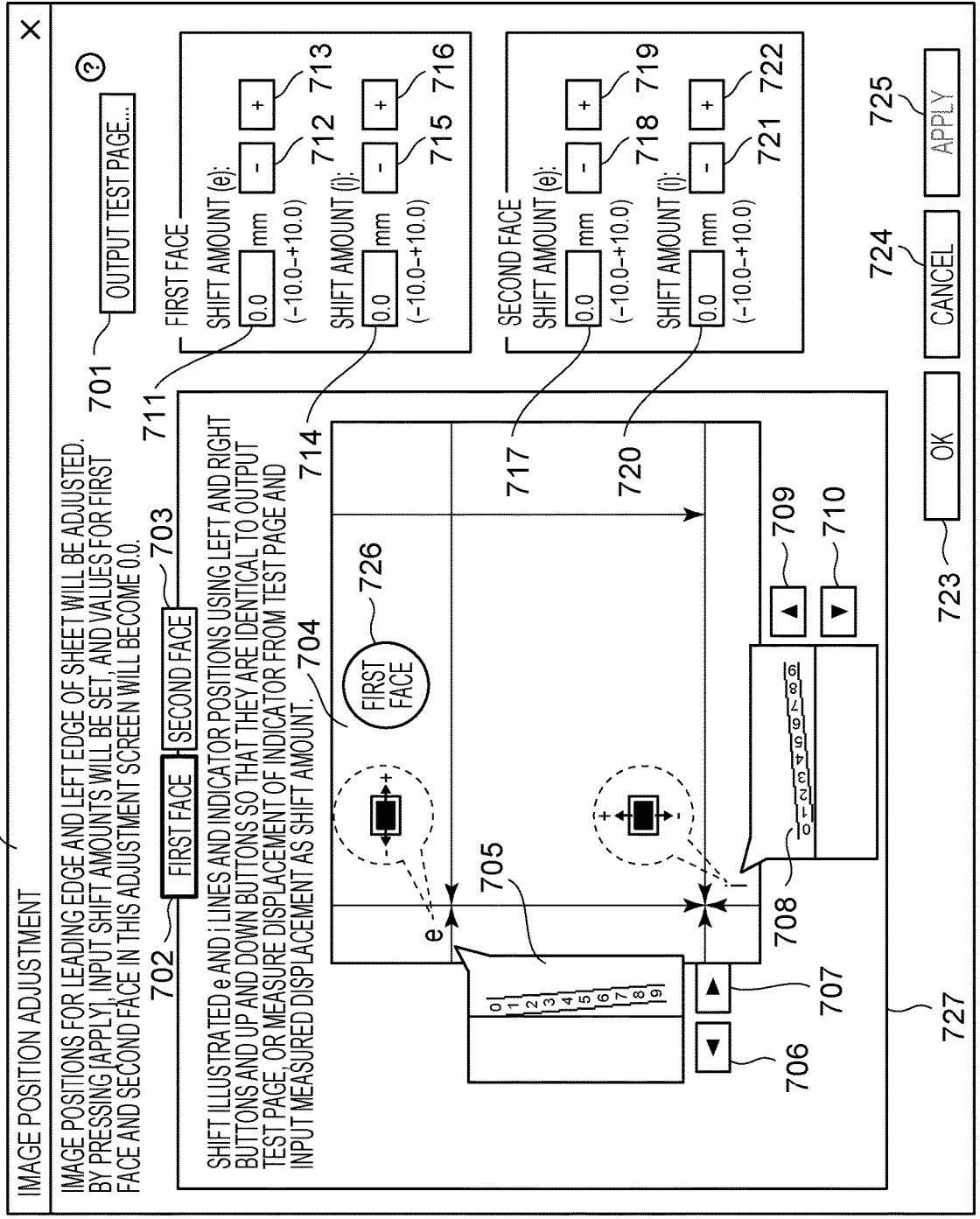
FIGS. 7A and 7B illustrate examples of screens according to the embodiment.

An image-position adjustment screen 700 in FIG. 7A will now be described. The image-position adjustment screen 700 is used for editing adjustment items for changing print positions on the first and second faces of a sheet (i.e., shift amounts from the lower edge and the left edge in this embodiment). In a display region 727, a preview image corresponding to a portion of print data of a test page is displayed. Alternatively, the entire test page may be displayed in the display region 727. In the display region 727, at least one of a lower-edge graphic scale 705 and a left-edge graphic scale 708 is displayed. Moreover, the display region 727 also displays a message for prompting the user to shift the preview image displayed in the display region 727 based on a result obtained by the image forming apparatus 103 printing the print data of the test page.

The operator performs an operation for shifting the display positions of predetermined images (i.e., the lower-edge graphic scale 705 and the left-edge graphic scale 708) in the preview-image display region 727. Then, the operator performs an operation such that the manner in which the lower-edge graphic scale 705 and the left-edge graphic scale 708 appear in the display region 727 matches the print result of the first face of the output test page. In accordance with the operation performed by the user, the image forming apparatus 103 performs display control for shifting the display positions of the predetermined images. By performing such an operation, the adjustment values for the image on the first face of the page can be set. In other words, the print control apparatus 102 sets values for adjusting the position where the image forming apparatus 103 prints an image onto a recording medium based on the display positions of the predetermined images in the display region 727. The set values are transmitted to the image forming apparatus 103. The image forming apparatus 103 adjusts the image print position based on the set values received from the print control apparatus 102. The image position can be similarly adjusted for the second face. The test page will be described later with reference to FIGS. 14A and 14B.

The image-position adjustment screen 700 renders an image in the RAM 302 in accordance with a command from the CPU 301, and also outputs image data rendered in the RAM 302 as a video signal to the display device 111 where the image is displayed. In the image-position adjustment screen 700, a test-page output button 701, a first-face button 702, a second-face button 703, an OK button 723, a cancel button 724, and an apply button 725 are displayed. Furthermore, the image-position adjustment screen 700 also displays adjustment components 704 to 710 using graphic scales and adjustment components 711 to 722 used for inputting numerical values as shift amounts measured from the print result.

The adjustment components using graphic scales displayed in the image-position adjustment screen 700 are a preview image 704, the lower-edge graphic scale 705, a left button 706, a right button 707, the left-edge graphic scale 708, an up button 709, and a down button 710.

The user may operate the left button 706, the right button 707, the up button 709, and the down button 710 to shift the display positions of the graphic scales, such that the graphic scales are partially or entirely not displayed within the display region. The graphic-scale shifting method is not limited to this. The graphic scales may alternatively be shifted by performing a drag-and-drop operation or a touching operation on the graphic scales or the preview image 704.

Reference signs "e" and "i" and arrows in the preview image 704 are identification information for identifying which section of the test-page print data is being previewed. The image-position adjustment screen 700 displays first-face numerical-value input fields and second-face numerical-value input fields as adjustment components used for inputting numerical values as displacement amounts measured from the print result. The first-face numerical-value input fields include an input field 711 corresponding to a shift amount e from the lower edge, a − button 712, a + button 713, an input field 714 corresponding to a shift amount i from the left edge, a − button 715, and a + button 716. The second-face numerical-value input fields include an input field 717 corresponding to a shift amount e from the lower edge, a − button 718, a + button 719, an input field 720 corresponding to a shift amount i from the left edge, a − button 721, and a + button 722.

The test-page output button 701 is used for giving a command for displaying an adjustment test-page output screen 740. In this embodiment, when the test-page output button 701 is clicked, the controller 300 of the print control apparatus 102 displays the test-page output screen 740 in FIG. 7B at the front. Then, when a print button 745 in the output screen 740 is selected, a print command for causing the image forming apparatus 103 to print the test page is given.

Figure 14A:
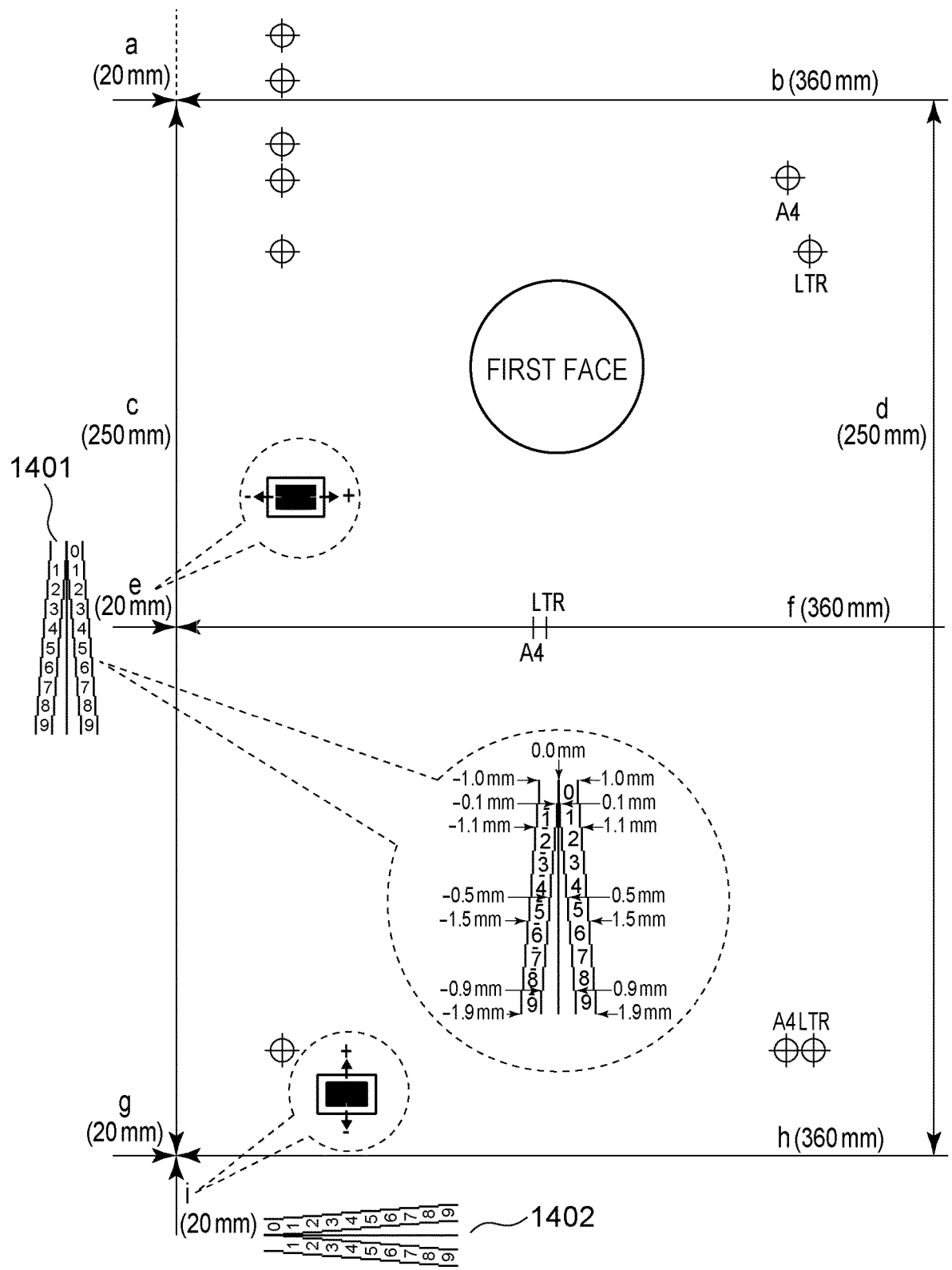
FIGS. 14A and 14B illustrate examples of print data for first and second faces of a test page.
Figure 14B:
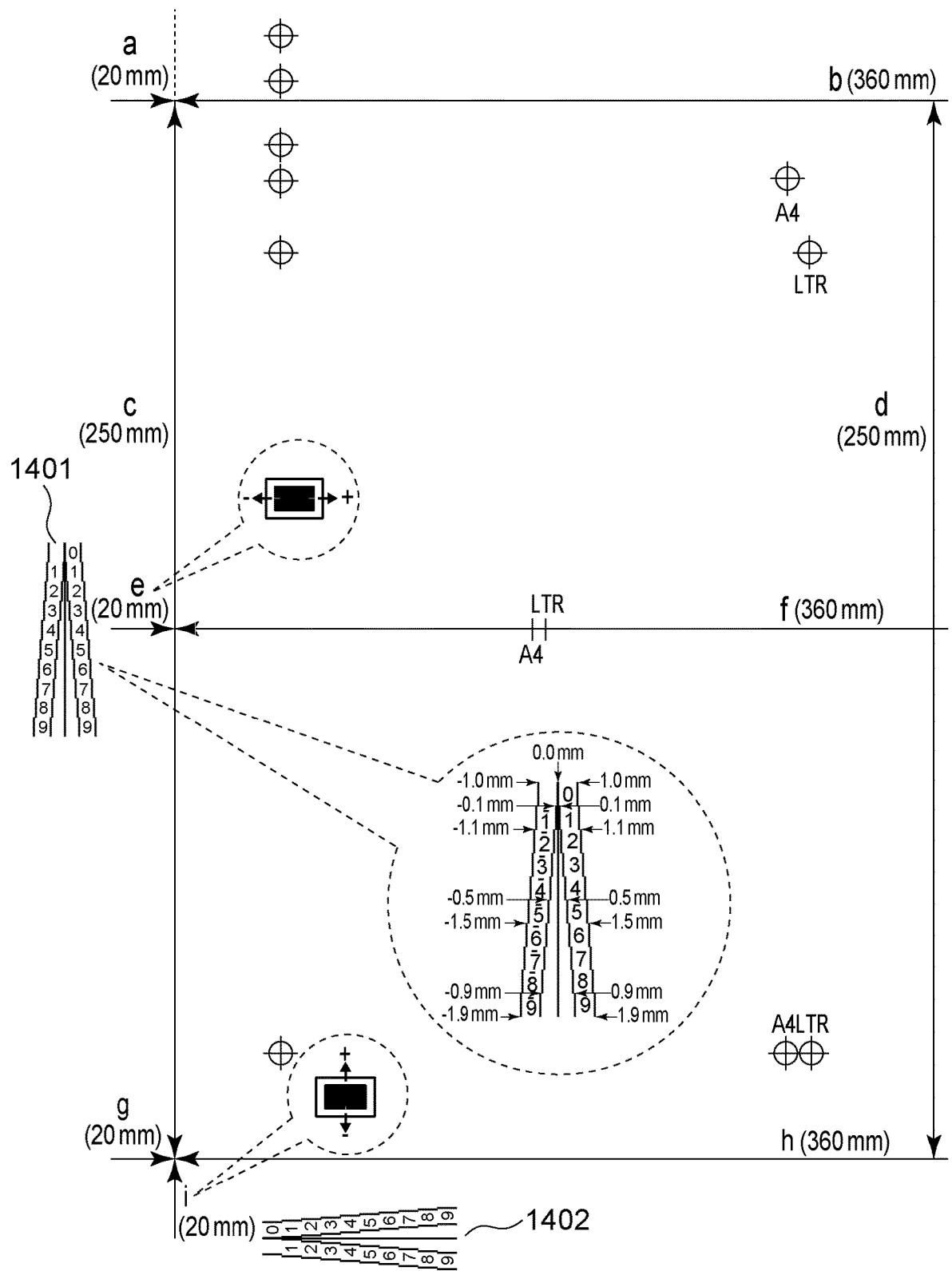

The external storage device 210 of the image forming apparatus 103 stores therein test-page print data shown in FIGS. 14A and 14B. FIG. 14A illustrates an example of first-face test-page print data (first print data). FIG. 14B illustrates an example of second-face test-page print data (second print data).

When the image forming apparatus 103 receives the test-page print command from the print control apparatus 102, the image forming apparatus 103 reads the test-page print data from the external storage device 210 and executes printing. The test-page print data contains a scale 1401 and a scale 1402 as images used for performing an image adjustment. The operator may check the print results of these scales 1401 and 1402 to perform an image position adjustment. As an alternative to this embodiment in which the test-page print data is stored in the image forming apparatus 103, the test-page print data may be stored in the print control apparatus 102, and the print control apparatus 102 may transmit the test-page print data to the image forming apparatus 103 in accordance with a test-page print command given by the user.

The first-face button 702 is used for switching the input mode for the adjustment components using graphic scales and the display mode for the preview image 704 to those for the first face. In this embodiment, when the first-face button 702 is clicked, the controller 300 of the print control apparatus 102 switches the preview image 704 to a first-face image. Moreover, the scale positions of the lower-edge graphic scale 705 and the left-edge graphic scale 708 are changed in accordance with the first-face display positions stored in the image-position adjustment screen 700, thereby updating the display. Furthermore, by cancelling the selected mode of the second-face button 703 and setting the first-face button 702 to a selected mode, it is indicated that the first face is selected.

The second-face button 703 is used for switching the input mode for the adjustment components using graphic scales and the display mode for the preview image 704 to those for the second face. In this embodiment, when the second-face button 703 is clicked, the controller 300 of the print control apparatus 102 switches the preview image 704 to a second-face image. Moreover, the scale positions of the lower-edge graphic scale 705 and the left-edge graphic scale 708 are changed in accordance with the second-face display positions stored in the image-position adjustment screen 700, thereby updating the display. Furthermore, by cancelling the selected mode of the first-face button 702 and setting the second-face button 703 to a selected mode, it is indicated that the second face is selected.

The preview image 704 is a region that displays a preview of the characteristics of the test page to be output using the test-page output button 701. In this embodiment, the preview image 704 displayed by the controller 300 of the print control apparatus 102 includes symbols (i.e., e, i, and parts of ruled lines) indicating check points for the lower-edge and left-edge scales and marks indicating + and − directions of input shift amounts. If the first-face button 702 is selected, the controller 300 of the print control apparatus 102 displays a first-face mark 726 over the preview image 704 as information for identifying the first face and the second face. Accordingly, the preview image 704 displayed in the display region 727 can be used for distinguishing whether print data to be printed onto the first face of the page is displayed or print data to be printed onto the second face of the page is displayed.

The lower-edge graphic scale 705 is to be shifted by using the left button 706 and the right button 707 so as to match the lower-edge scale printed on the test page. An example of a scale to be displayed is a scale 900 in FIG. 9A. Although the lower-edge graphic scale 705 and the left-edge graphic scale 708 are displayed in an expanded fashion in the example in FIGS. 7A and 7B, such expanded display is not mandatory.

Figure 9A:
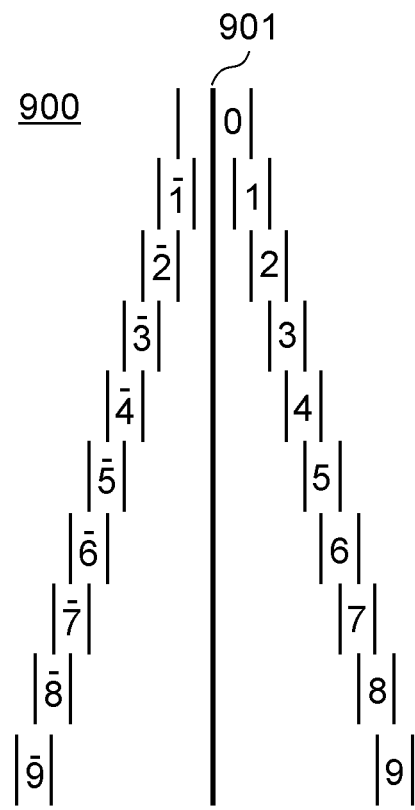
FIGS. 9A and 9B are diagrams related to the embodiment.
Figure 9B:
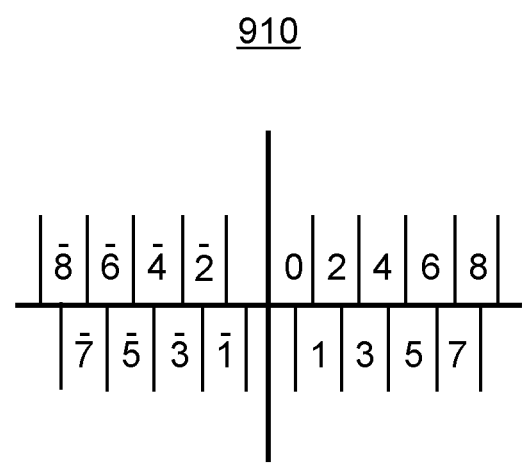

The scale is not limited to the scale 900 in FIG. 9A and may be any scale having characteristics that allow the appearances to match by comparing the output test page with the image-position adjustment screen 700. For example, a scale 910 in FIG. 9B may be used. In this embodiment, as an initial position when the image-position adjustment screen 700 is displayed, the scale 900 is displayed such that a center line 901 thereof is aligned with the lower edge of the test page (i.e., the current shift amount e is 0.0 mm), as shown in FIG. 7A. When the left button 706 is clicked once, the scale 900 of the lower-edge graphic scale 705 shifts leftward by 0.1 mm, and the current shift amount e in the input field 711 (or the input field 717 when the second face is selected) increases by 0.1. When the right button 707 is clicked once, the scale 900 of the lower-edge graphic scale 705 shifts rightward by 0.1 mm, and the current shift amount e in the input field 711 (or the input field 717 when the second face is selected) decreases by 0.1.

Figure 10A:
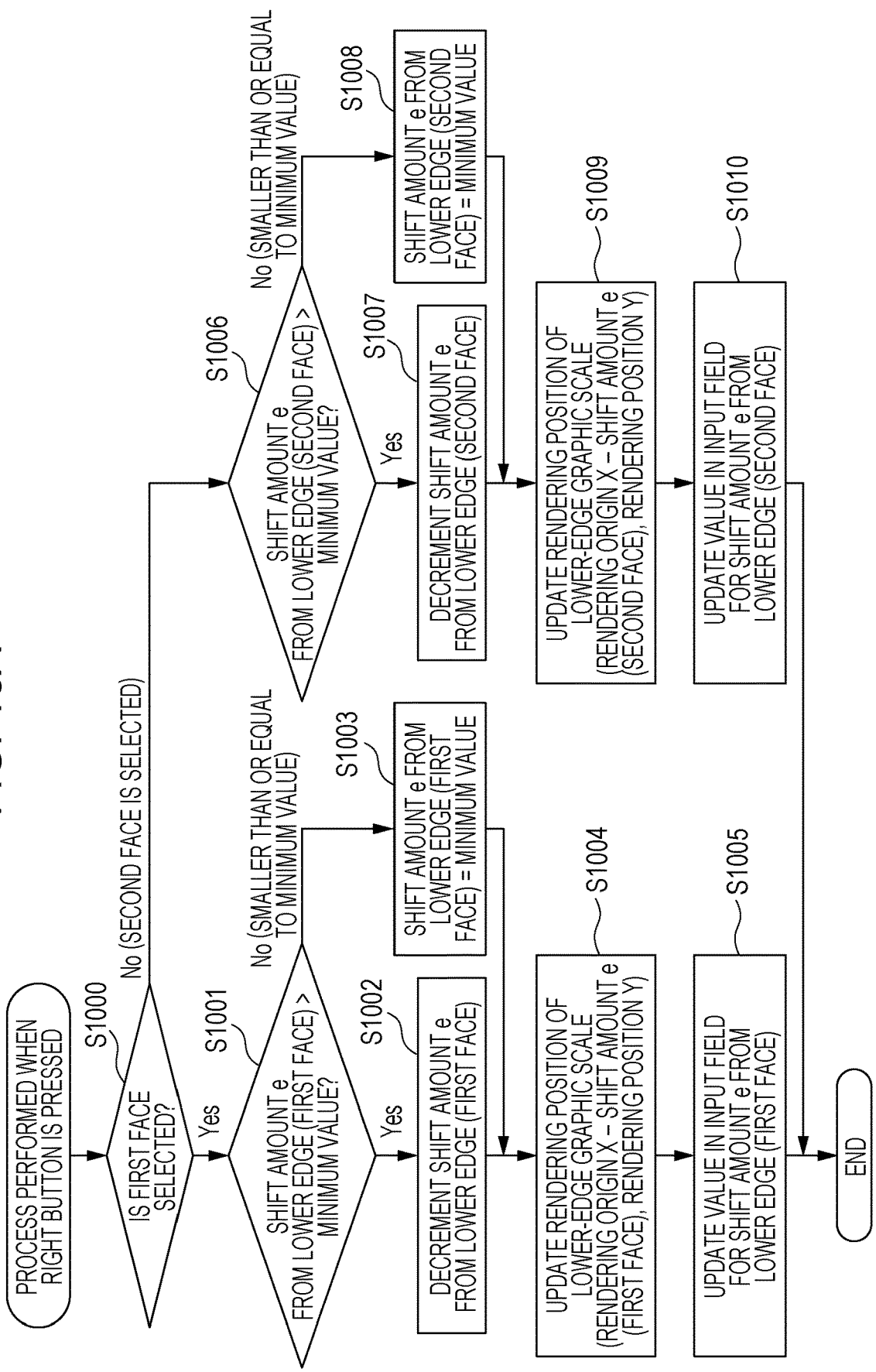
FIGS. 10A and 10B are flowcharts illustrating examples of processes according the embodiment.

A process performed when the right button 707 of the lower-edge graphic scale 705 is clicked will now be described with reference to a flowchart in FIG. 10A.

In step S1000, the controller 300 of the print control apparatus 102 determines whether the first-face button 702 is selected so as to determine whether to perform a process for the first face or a process for the second face. If the first face is selected, the process proceeds to step S1001. If the first face is not selected, the process proceeds to step S1006.

In step S1001, the controller 300 of the print control apparatus 102 determines whether the current shift amount e from the lower edge (first face) is larger than a minimum value. If the current shift amount e is larger than the minimum value, the process proceeds to step S1002. If the current shift amount e is smaller than or equal to the minimum value, the process proceeds to step S1003.

In step S1002, the controller 300 of the print control apparatus 102 decrements the current shift amount e from the lower edge (first face) by 0.1.

In step S1003, the controller 300 of the print control apparatus 102 sets the minimum value since the current shift amount e from the lower edge (first face) is smaller than or equal to the minimum value processable by the image forming apparatus 103.

In step S1004, the controller 300 of the print control apparatus 102 updates the rendering position of the scale 900 of the lower-edge graphic scale 705. In detail, control is performed such that the scale 900 of the lower-edge graphic scale 705 is shifted rightward by 0.1 mm. In this embodiment, rendering is performed at a position obtained by subtracting the current shift amount e from the lower edge (first face) from the X coordinate of the rendering origin of the lower-edge graphic scale 705 and at the Y coordinate of the rendering origin of the lower-edge graphic scale 705.

In step S1005, the controller 300 of the print control apparatus 102 displays the current shift amount e from the lower edge (first face) in the input field 711.

With regard to step S1006 to step S1010, since the flow is the same as the flow from step S1001 to step S1005 except that the current shift amount e from the lower edge (second face) is controlled in a state where the second face is selected, the description thereof will be omitted.

Figure 10B:
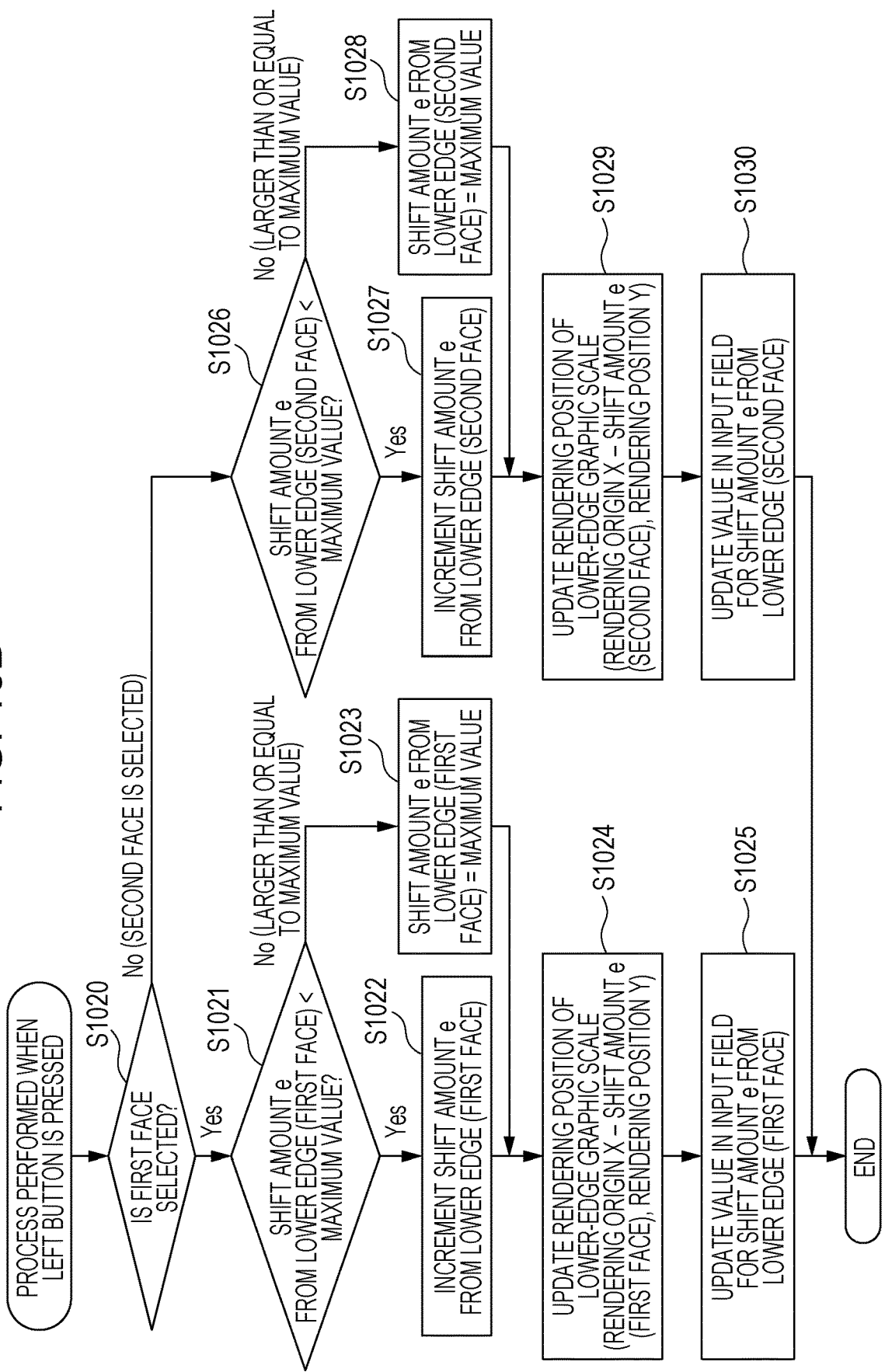

Next, a process performed when the left button 706 of the lower-edge graphic scale 705 is clicked will be described with reference to a flowchart in FIG. 10B.

In step S1020, the controller 300 of the print control apparatus 102 determines whether the first-face button 702 is selected so as to determine whether to perform a process for the first face or a process for the second face. If the first face is selected, the process proceeds to step S1021. If the first face is not selected, the process proceeds to step S1026.

In step S1021, the controller 300 of the print control apparatus 102 determines whether the current shift amount e from the lower edge (first face) is smaller than a maximum value. If the current shift amount e is smaller than the maximum value, the process proceeds to step S1022. If the current shift amount e is larger than or equal to the maximum value, the process proceeds to step S1023.

In step S1022, the controller 300 of the print control apparatus 102 increments the current shift amount e from the lower edge (first face) by 0.1.

In step S1023, the controller 300 of the print control apparatus 102 sets the maximum value since the current shift amount e from the lower edge (first face) is larger than or equal to the maximum value processable by the image forming apparatus 103.

In step S1024, the controller 300 of the print control apparatus 102 updates the rendering position of the scale 900 of the lower-edge graphic scale 705. In detail, control is performed such that the scale 900 of the lower-edge graphic scale 705 is shifted leftward by 0.1 mm. In this embodiment, rendering is performed at a position obtained by subtracting the current shift amount e from the lower edge (first face) from the X coordinate of the rendering origin of the lower-edge graphic scale 705 and at the Y coordinate of the rendering origin of the lower-edge graphic scale 705.

In step S1025, the controller 300 of the print control apparatus 102 displays the current shift amount e from the lower edge (first face) in the input field 711.

With regard to step S1026 to step S1030, since the flow is the same as the flow from step S1021 to step S1025 except that the current shift amount e from the lower edge (second face) is controlled in a state where the second face is selected, the description thereof will be omitted.

Referring back to FIG. 7A, the left-edge graphic scale 708 is to be shifted by using the up button 709 and the down button 710 so as to match the left-edge scale printed on the test page. An example of a scale to be displayed is the scale 900 in FIG. 9A. In this embodiment, as an initial position when the image-position adjustment screen 700 is displayed, the scale 900 is displayed such that the center line 901 thereof is aligned with the lower edge of the test page (i.e., the current shift amount i is 0.0 mm), as shown in FIG. 7A. When the up button 709 is clicked once, the scale 900 of the left-edge graphic scale 708 shifts upward by 0.1 mm, and the current shift amount i in the input field 714 (or the input field 720 when the second face is selected) decreases by 0.1. When the down button 710 is clicked once, the scale 900 of the left-edge graphic scale 708 shifts downward by 0.1 mm, and the current shift amount i in the input field 714 (or the input field 720 when the second face is selected) increases by 0.1.

Figure 11A:
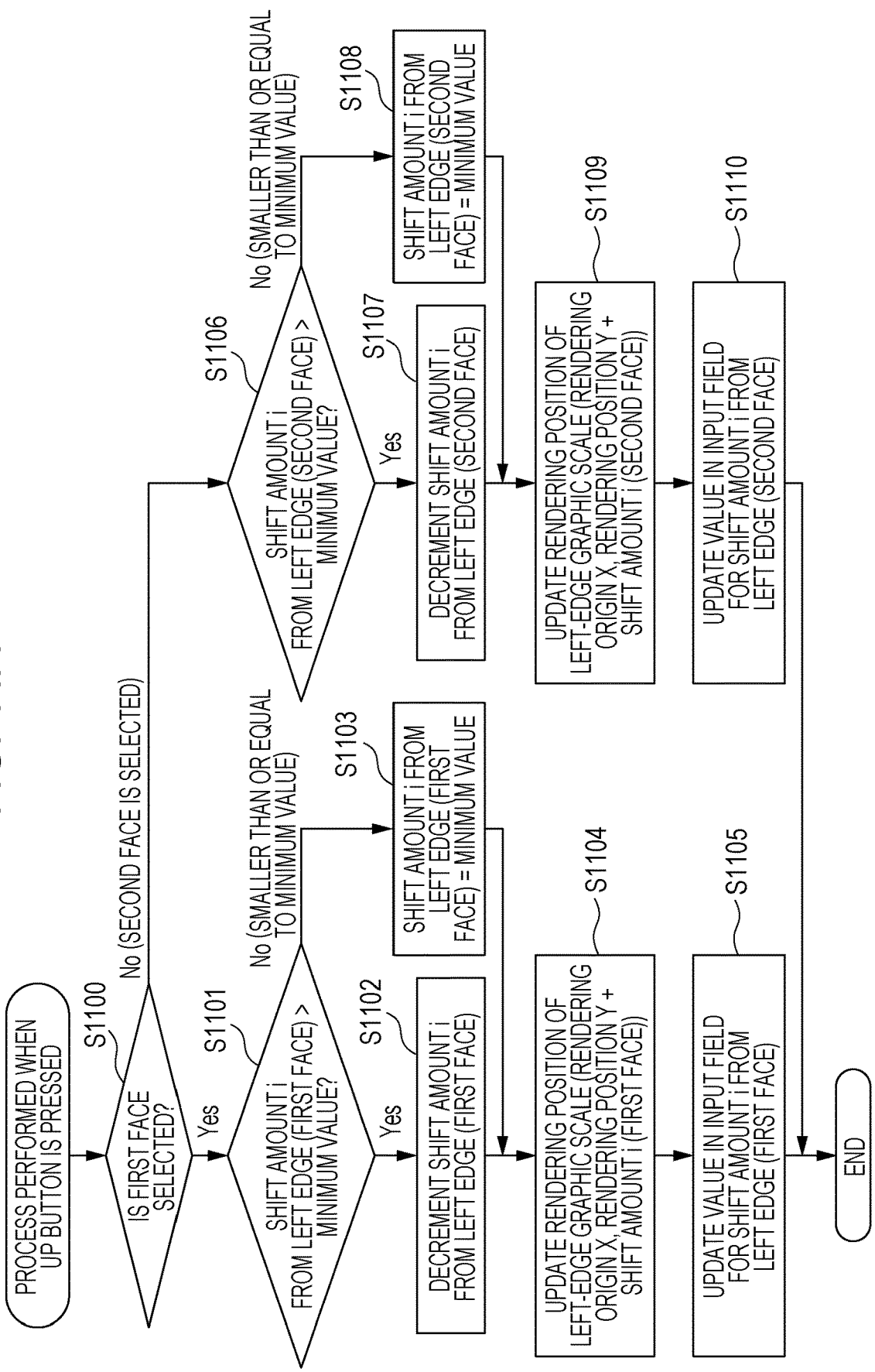
FIGS. 11A and 11B are flowcharts illustrating examples of processes according to the embodiment.

A process performed when the up button 709 of the left-edge graphic scale 708 is clicked will now be described with reference to a flowchart in FIG. 11A while focusing only on the differences from FIG. 10A.

Since step S1100 to step S1110 are the same as step S1000 to step S1010 except that the current shift amount i from the left edge is controlled and that the rendering updating coordinates are different, a detailed description of the flow will be omitted.

Figure 11B:
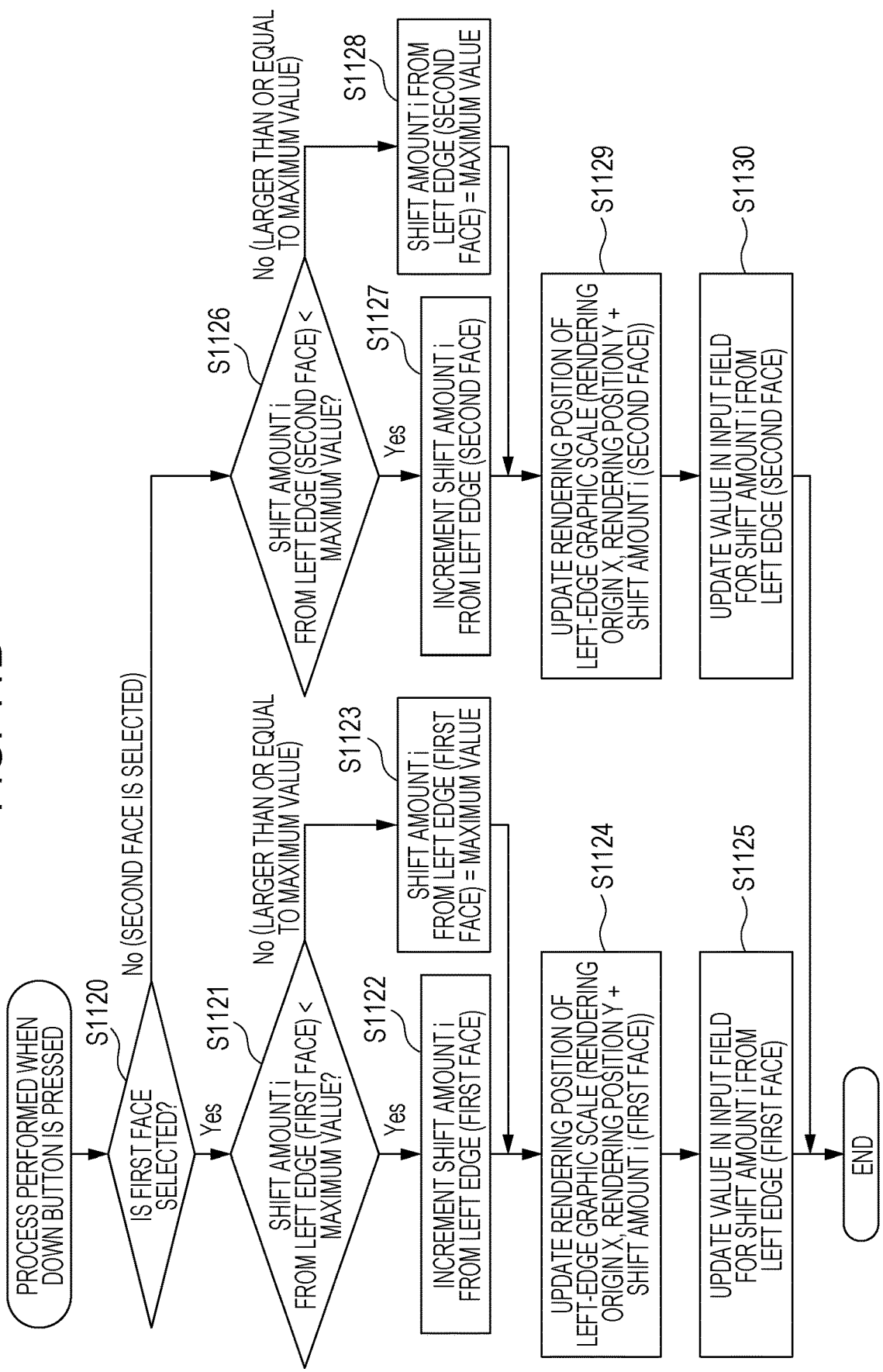

Next, a process performed when the down button 710 of the left-edge graphic scale 708 is clicked will be described with reference to a flowchart in FIG. 11B while focusing only on the differences from FIG. 10B.

Since step S1120 to step S1130 are the same as step S1020 to step S1030 except that the current shift amount i from the left edge is controlled and that the rendering updating coordinates are different, a detailed description of the flow will be omitted.

Referring back to FIG. 7A, the input field 711 is where the shift amount e from the lower edge of the first face is input. In this embodiment, the controller 300 of the print control apparatus 102 receives a numerical value input by using the keyboard 112 or a numerical value input by using the − button 712 and the + button 713. When the + button 713 is clicked once, the scale 900 of the lower-edge graphic scale 705 on the first face shifts leftward by 0.1 mm, and the current shift amount e in the input field 711 increases by 0.1. When the − button 712 is clicked once, the scale 900 of the lower-edge graphic scale 705 shifts rightward by 0.1 mm, and the current shift amount e in the input field 711 decreases by 0.1.

The input field 714 is where the shift amount i from the left edge of the first face is input. In this embodiment, the controller 300 of the print control apparatus 102 receives a numerical value input by using the keyboard 112 or a numerical value input by using the − button 715 and the + button 716. Since the process for shifting the left-edge graphic scale 708 in conjunction with an input to the input field 714 is basically the same as the process corresponding to the input field 711, a description thereof will be omitted.

The input field 717 is where the shift amount e from the lower edge of the second face is input. In this embodiment, the controller 300 of the print control apparatus 102 receives a numerical value input by using the keyboard 112 or a numerical value input by using the − button 718 and the + button 719. Since the process for shifting the lower-edge graphic scale 705 in conjunction with an input to the input field 717 is basically the same as the process corresponding to the input field 711, a description thereof will be omitted.

The input field 720 is where the shift amount i from the left edge of the first face is input. In this embodiment, the controller 300 of the print control apparatus 102 receives a numerical value input by using the keyboard 112 or a numerical value input by using the – button 721 and the + button 722. Since the process for shifting the left-edge graphic scale 708 in conjunction with an input to the input field 720 is basically the same as the process corresponding to the input field 711, a description thereof will be omitted.

The OK button 723 is used for setting the adjustment contents input in the image-position adjustment screen 700 to the image forming apparatus 103 and for closing the image-position adjustment screen 700.

The cancel button 724 is used for closing the image-position adjustment screen 700 without performing the sheet setting process for the image forming apparatus 103.

The apply button 725 is used for setting the adjustment contents input in the image-position adjustment screen 700 to the image forming apparatus 103 without closing the image-position adjustment screen 700. In this embodiment, the controller 300 of the print control apparatus 102 performs control such that the apply button 725 is clickable only when there is a difference from the current setting contents.

Test-Page Output Screen

Figure 7B:
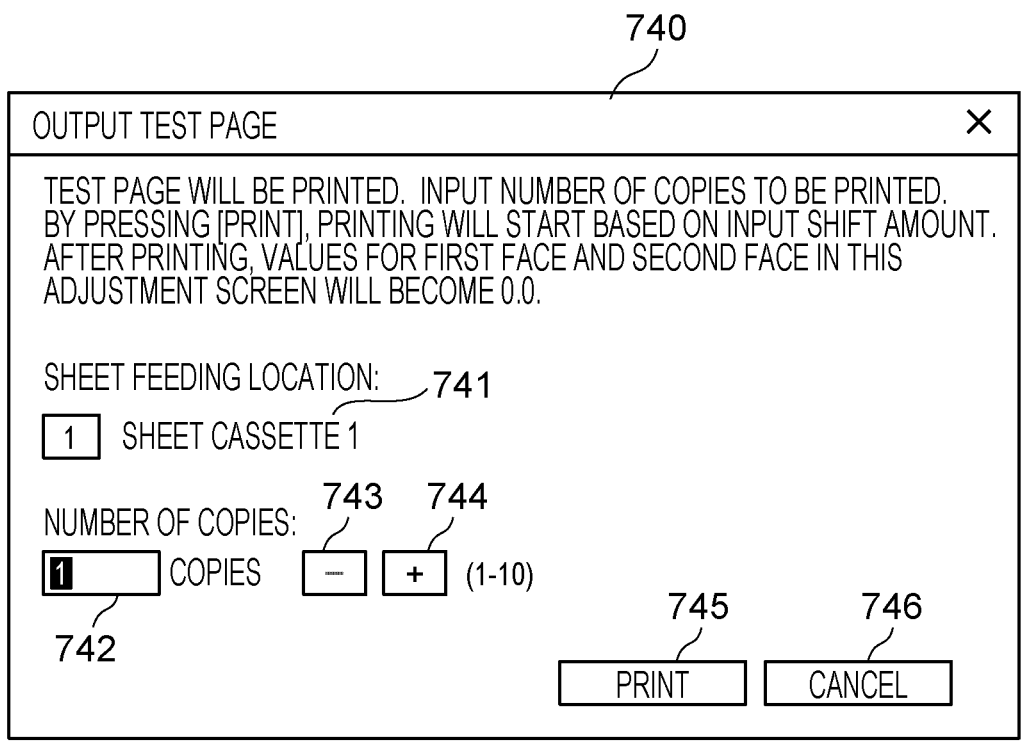

The test-page output screen 740 in FIG. 7B will now be described. The test-page output screen 740 renders an image in the RAM 302 in accordance with a command from the CPU 301, and also outputs image data rendered in the RAM 302 as a video signal to the display device 111 where the image is displayed. The test-page output screen 740 has a region 741 indicating a sheet feeding location for printing the test page, a number-of-copies input section 742, a button 743 used for decrementing the number of copies, and a button 744 used for incrementing the number of copies. The number-of-copies input section 742 can be used for designating the number of copies from, for example, 1 to 10 copies. In a case where the number-of-copies input section 742 reaches 1 copy, the button 743 grays out. In a case where the number-of-copies input section 742 reaches 10 copies, the button 744 grays out. The print button 745 for giving a command for outputting the test page and a cancel button 746 are also displayed.

Figure 8A:
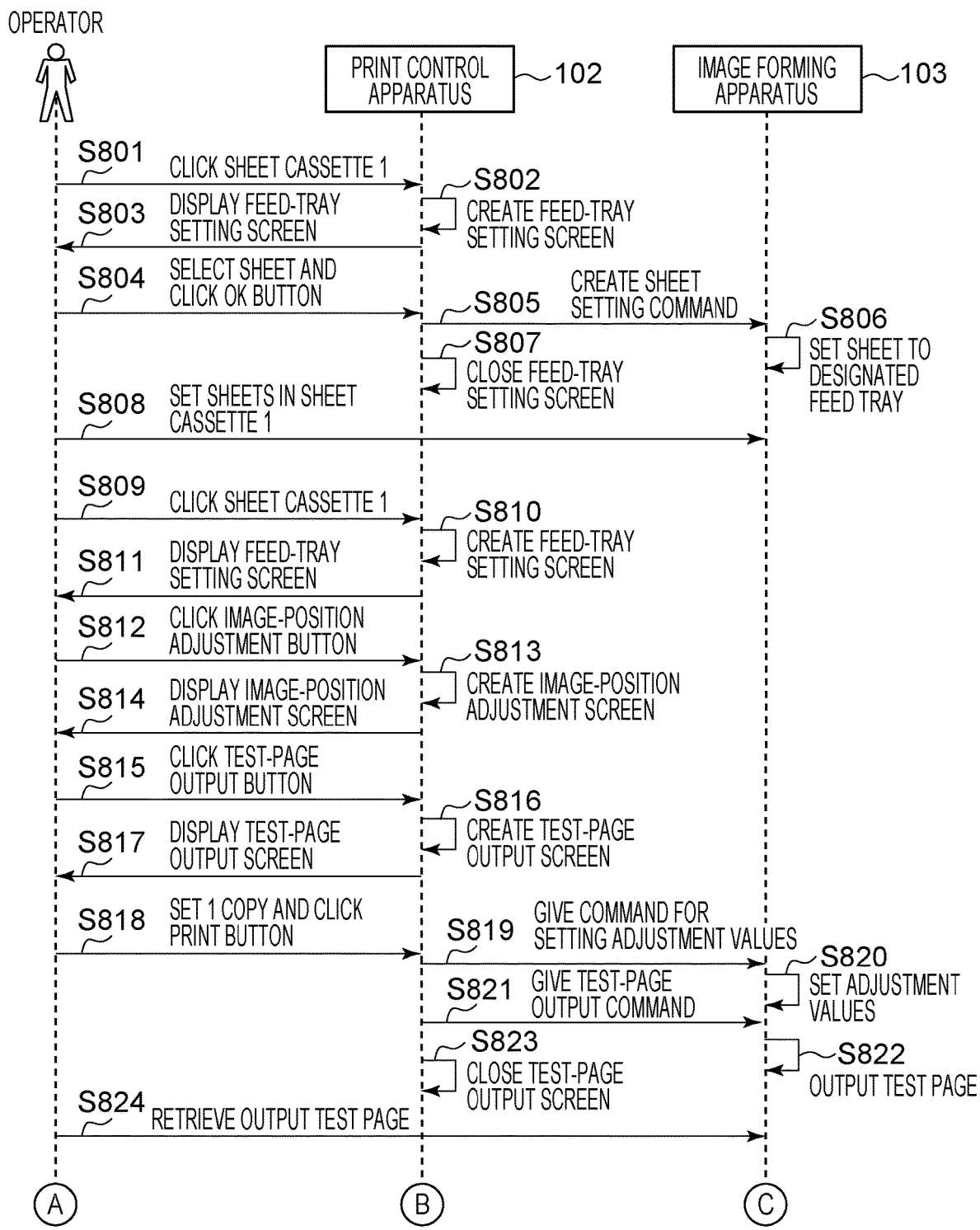
FIGS. 8A and 8B are sequence diagrams illustrating an example of a process according to the embodiment.
Figure 8B:
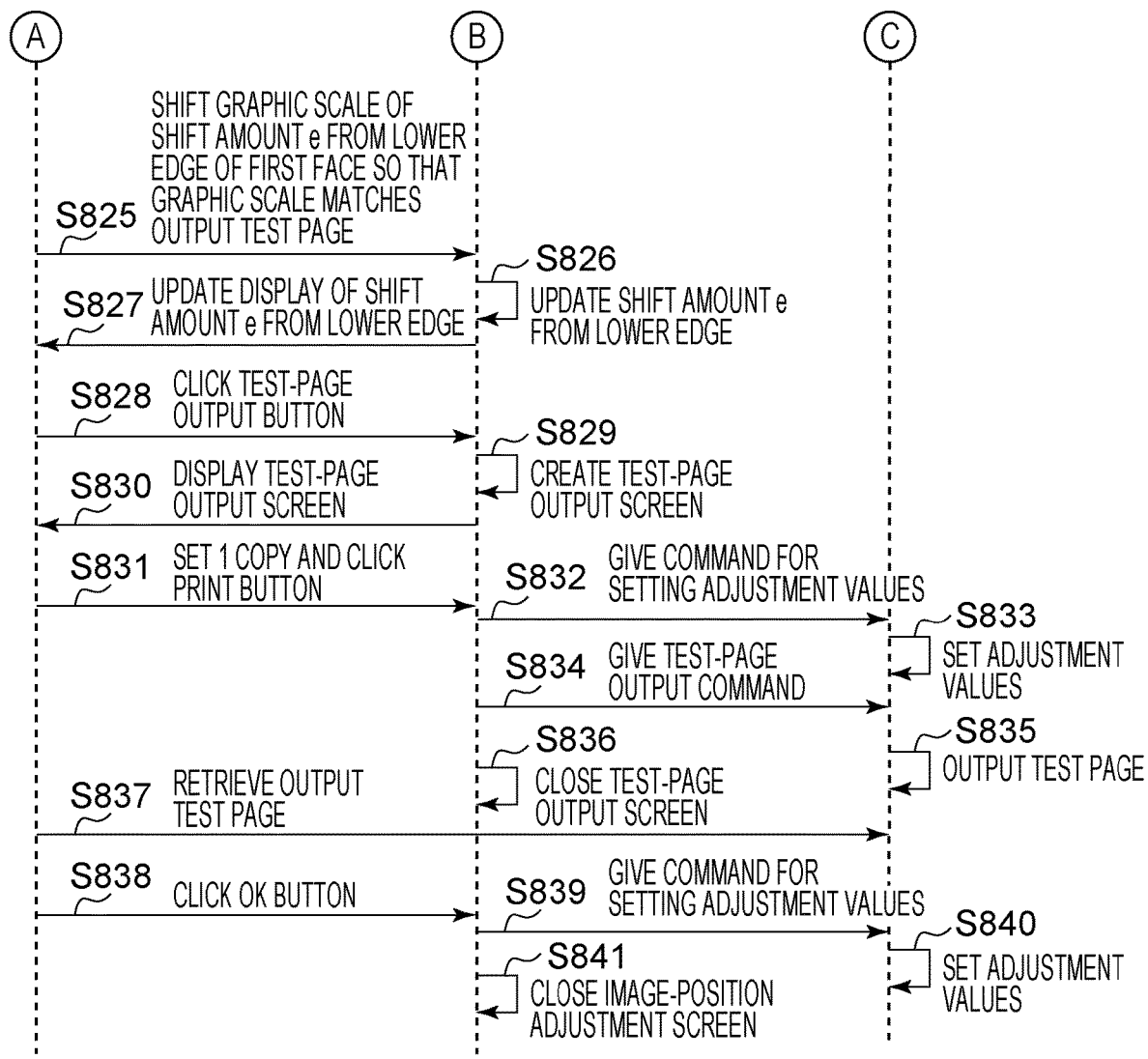

Processes of the print control apparatus 102 and the image forming apparatus 103 according to the first embodiment will now be described with reference to FIGS. 8A and 8B. A program of the print control apparatus 102 to be described below is stored in the external storage device 309 in FIG. 3A, is loaded in the RAM 302, and is executed by the CPU 301. In this embodiment, an example where the operator activates an application in the print control apparatus 102, sets a sheet in the sheet cassette 1 in the image forming apparatus 103, and adjusts the shift amount e from the lower edge of the first face for adjusting the image position will be described.

Process for Activating Application for Sheet Management Operation

An application for performing a sheet management operation is stored in the external storage device 309 in FIG. 3A, is loaded in the RAM 302, and is executed by the CPU 301. When the sheet management system 100 is activated, the controller 300 of the print control apparatus 102 generates and displays a connection-destination input screen.

The controller 300 of the print control apparatus 102 connects to a print control apparatus corresponding to an IP address input in the connection-destination input screen.

The controller 300 of the print control apparatus 102 communicates with the image forming apparatus 103 to determine the model of the image forming apparatus 103 and to acquire connected feed-tray information and sheet list information. For example, the feed-tray information to be acquired here includes a feed-tray name, a feed-tray ID, and the remaining number of sheets in the feed tray. The controller 300 controls the feed-tray management unit 354 to write the acquired feed-tray information in the feed-tray-setting management table 410. The sheet list information includes a sheet name, parameters necessary for printing (such as the basis weight and the size of the sheet and set values for the image position adjustment), and a settable feed-tray ID. When the sheet list information is acquired, the controller 300 controls the sheet management unit 353 to write the acquired sheet list information in the sheet-setting management table 400.

The controller 300 of the print control apparatus 102 generates the top screen 500 and the sheet list screen 520 in FIG. 5 based on the information.

Operation Flow from Sheet Setting to Image Position Adjustment

The flow of the process performed by the operator for changing the settings of the sheet and the printing process will now be described with reference to FIGS. 8A and 8B.

In step S801, the operator clicks the feed-tray button 502 for the sheet cassette 1 in the top screen 500 of the sheet management system 100.

In step S802, the controller 300 of the print control apparatus 102 controls the UI control unit 352 to acquire the sheet-setting management table 400 from the sheet management unit 353. Moreover, the controller 300 performs control to acquire the feed-tray-setting management table 410 from the feed-tray management unit 354. The controller 300 controls the UI control unit 352 to create the setting screen 600 for the sheet cassette 1 in accordance with an acquired sheet list and feed-tray information.

In step S803, the controller 300 of the print control apparatus 102 controls the UI control unit 352 to display the setting screen 600 on the display device 111.

In step S804, the operator selects a sheet to be used for printing and clicks the OK button 603 in the setting screen 600.

In step S805, the controller 300 of the print control apparatus 102 controls the sheet management unit 353 to create a sheet setting command for registering information about the sheet-setting management table 400 corresponding to the selected sheet to the sheet cassette 1. The controller 300 causes the network control unit 355 to control the LAN controller 306 so as to transmit the sheet setting command to the image forming apparatus 103 via the control cable 108.

In step S806, when the LAN controller 206 receives the sheet setting command, the controller 200 of the image forming apparatus 103 performs control to set the received sheet information to the designated feed tray (i.e., the sheet cassette 1 in this case).

In step S807, the controller 300 of the print control apparatus 102 controls the UI control unit 352 to close the setting screen 600.

In step S808, the operator opens the sheet cassette 1 of the image forming apparatus 103 and sets a sheet bundle therein. The operator then closes the sheet cassette 1.

In step S809, the operator clicks the feed-tray button 502 for the sheet cassette 1 in the top screen 500 of the sheet management system 100.

Descriptions for step S810 and step S811 will be omitted since they are the same as step S802 and step S803.

In step S812, the operator clicks the image-position adjustment button 601 in the setting screen 600.

In step S813, the controller 300 of the print control apparatus 102 controls the UI control unit 352 to create the image-position adjustment screen 700.

In step S814, the controller 300 of the print control apparatus 102 controls the UI control unit 352 to display the image-position adjustment screen 700.

In step S815, the operator clicks the test-page output button 701 in the image-position adjustment screen 700.

In step S816, the controller 300 of the print control apparatus 102 controls the UI control unit 352 to create the test-page output screen 740 in which the sheet feeding location is the sheet cassette 1.

In step S817, the controller 300 of the print control apparatus 102 controls the UI control unit 352 to display the test-page output screen 740.

In step S818, the operator sets 1 copy in the number-of-copies input section 742 and clicks the print button 745.

In step S819, the controller 300 of the print control apparatus 102 controls the sheet management unit 353 to set the current adjustment values (i.e., the shift amounts e and i for the first face and the second face) for the sheet set in the sheet cassette 1 to the image forming apparatus 103.

In step S820, the controller 200 of the image forming apparatus 103 performs control to set the received adjustment values.

In step S821, the controller 300 of the print control apparatus 102 controls the UI control unit 352 to give a test-page output command to the image forming apparatus 103. The output command includes a command for setting the sheet cassette 1 as a sheet feeding location, a command for setting the designated number of copies to 1, and a command for designating a sheet ID set in the sheet cassette 1.

In step S822, in accordance with the received test-page output command, the controller 200 of the image forming apparatus 103 prints the test page based on the adjustment values (i.e., the shift amounts e and i for the first face and the second face) referred to using the designated feed tray and sheet ID as keys. In this case, it is assumed that the image forming apparatus 103 contains test-page print data. The controller 200 of the image forming apparatus 103 controls the job control unit 254 to output a print-data image signal to the printer engine 213 connected via the print interface 207 based on the received output command, so that printing is performed by the printer engine 213.

In step S823, the controller 300 of the print control apparatus 102 controls the UI control unit 352 to close the test-page output screen 740.

In step S824, the operator retrieves the output test page at the sheet discharging unit 106 of the image forming apparatus 103.

In step S825, the operator shifts the lower-edge graphic scale 705 by clicking the left button 706 and the right button 707 so that the lower-edge graphic scale 705 matches the print result of the first face of the output test page.

In step S826, the controller 300 of the print control apparatus 102 detects the clicking on the right button 707 and controls the UI control unit 352 to update the shift amount e from the lower edge of the first face.

In step S827, the controller 300 of the print control apparatus 102 controls the UI control unit 352 to update the image-position adjustment screen 700. In this case, the lower-edge graphic scale 705, the left-edge graphic scale 708, and the input fields 711, 714, 717, and 720 are set in a state where the current input results are reflected thereon.

In step S828, the operator clicks the test-page output button 701 in the image-position adjustment screen 700 to check the adjustment result.

Descriptions for step S829 and step S830 will be omitted since they are the same as step S816 and step S817.

In step S831, the operator sets 1 copy in the number-of-copies input section 742 and clicks the print button 745.

In step S832, the controller 300 of the print control apparatus 102 controls the sheet management unit 353 to set the adjustment values (i.e., the shift amounts e and i for the first face and the second face) currently input in the image-position adjustment screen 700 to the image forming apparatus 103.

Descriptions for step S833 to step S837 will be omitted since they are the same as step S820 to step S824.

In step S838, the operator clicks the OK button 723 in the image-position adjustment screen 700.

Descriptions for step S839 and step S840 will be omitted since they are the same as step S819 and step S820.

In step S841, the controller 300 of the print control apparatus 102 controls the UI control unit 352 to close the image-position adjustment screen 700.

The flow of the process involving setting a sheet in the sheet cassette 1 and performing an image position adjustment has been described above. Accordingly, the adjustment parameters are automatically set by matching the appearance of the print result of the test page with the preview on the adjustment screen, so that the operator can adjust the print position more easily.

Although an application that operates in the print control apparatus 102 is described in this embodiment, it is assumed that the application is controlled with a similar mechanism in the client computer 101. Furthermore, although an application that operates in the client computer 101 and the print control apparatus 102 is described, the embodiment is not limited to an application. An embodiment in which a similar mechanism is implemented in the image forming apparatus 103 is also possible.

Second Embodiment

In the first embodiment, the range in which the scale 900 is rendered by using the lower-edge graphic scale 705 or the left-edge graphic scale 708 may sometimes be smaller than the range processable by the image forming apparatus 103. In that case, if the right button 707 is clicked successively, the scale 900 in the lower-edge graphic scale 705 becomes outside the rendering range, thus making it difficult to check the scale 900 with the lower-edge graphic scale 705. Therefore, it becomes difficult for the operator to ascertain the current shift amount from the lower-edge graphic scale 705. In this embodiment, if the scale 900 in the lower-edge graphic scale 705 or the left-edge graphic scale 708 is outside the rendering range, a graphic indicating that the scale 900 is outside the range can be displayed.

The hardware configuration and the software configuration according to this embodiment will not be described here since they are similar to those in the first embodiment.

Figure 13:
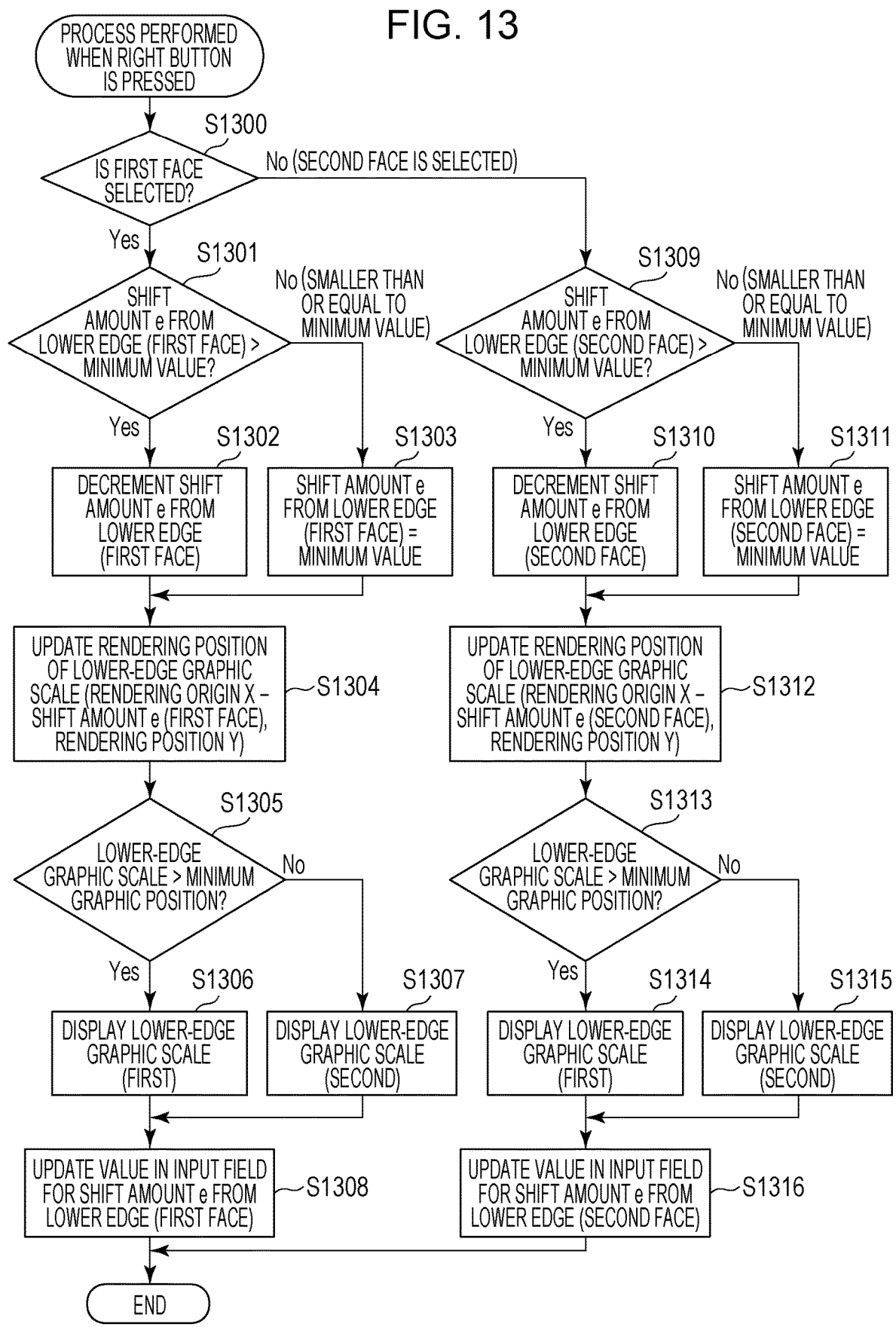
FIG. 13 is a flowchart illustrating an example of a process according to the second embodiment.

With regard to a process according to this embodiment, a process performed when the right button 707 is clicked with respect to the lower-edge graphic scale 705 will be described as an example with reference to FIG. 13. Descriptions for processes identical to those in FIGS. 10A and 10B will be omitted.

Descriptions for step S1300 to step S1304 will be omitted since they are the same as step S1000 to step S1004.

In step S1305, the controller 300 of the print control apparatus 102 determines whether the lower-edge graphic scale position calculated in step S1304 is larger than a minimum position of the rendering range. If the lower-edge graphic scale position calculated in step S1304 is larger than the minimum position of the rendering range, the process proceeds to step S1306. If the lower-edge graphic scale position calculated in step S1304 is smaller than or equal to the minimum position of the rendering range, the process proceeds to step S1307.

In step S1306, the controller 300 of the print control apparatus 102 causes the UI control unit 352 to display a graphic indicating that the lower-edge graphic scale position is within the rendering range. In this embodiment, control is performed such that the lower-edge graphic scale 705 in FIG. 7A is displayed.

Figure 12:
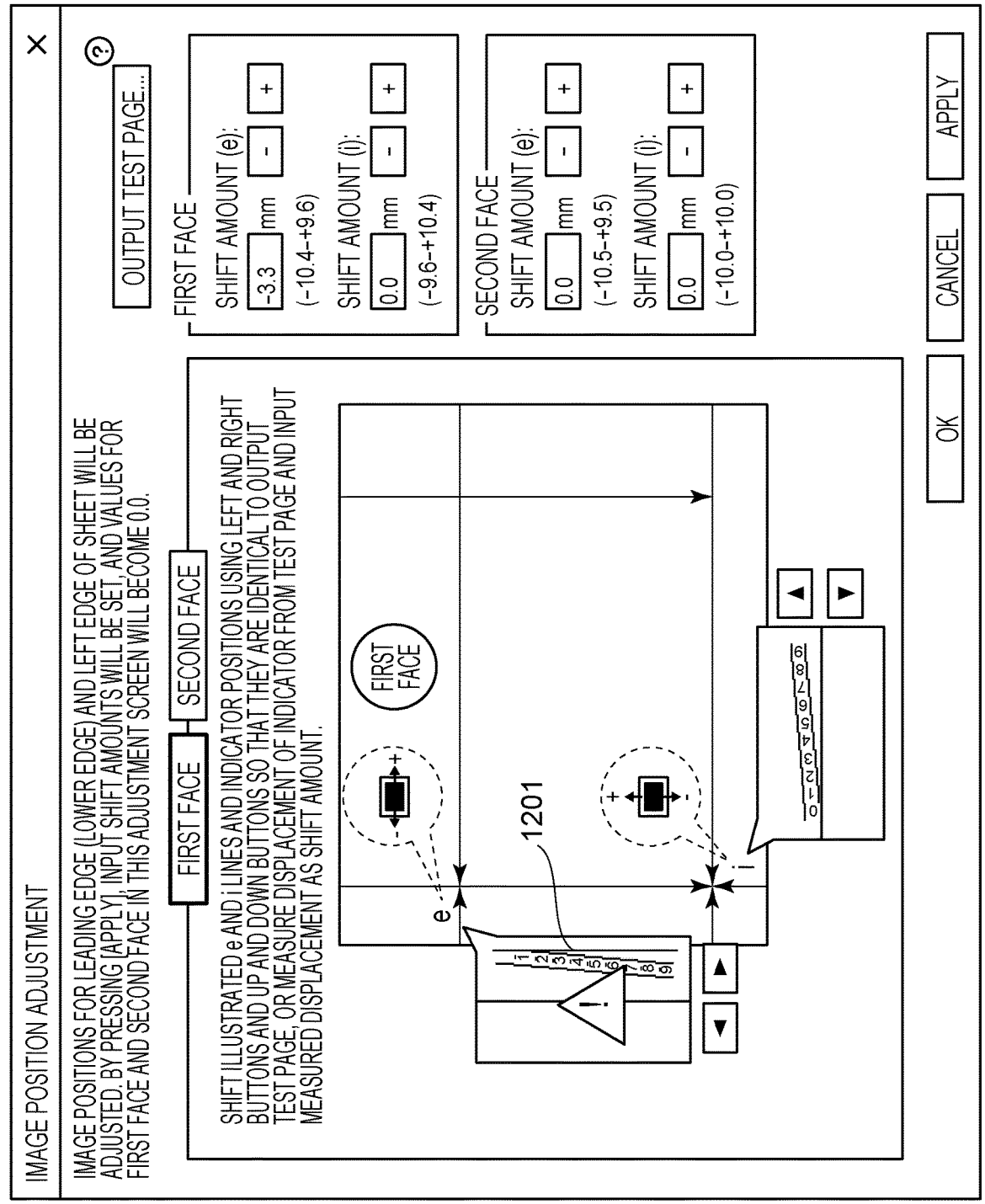
FIG. 12 illustrates an example of a screen according to a second embodiment.

In step S1307, the controller 300 of the print control apparatus 102 causes the UI control unit 352 to display a graphic indicating that the lower-edge graphic scale position is outside the display region. In this embodiment, control is performed such that a lower-edge graphic scale 1201 in FIG. 12 is displayed.

A description for step S1308 will be omitted since it is the same as step S1005.

Descriptions for step S1309 to step S1312 will be omitted since they are the same as step S1006 to step S1009.

Descriptions for step S1313 to step S1315 will be omitted since they are the same as step S1305 to step S1307.

A description for step S1316 will be omitted since it is the same as step S1010.

As an alternative to the above description where the lower-edge graphic scale 1201 is displayed when the lower-edge graphic scale position is smaller than or equal to the minimum position of the rendering range, different graphics may be displayed so that a case where the lower-edge graphic scale position is larger than or equal to the maximum position and a case where the lower-edge graphic scale position is larger than or equal to the minimum position can be distinguished from each other.

The flow of the process for displaying a graphic indicating that the scale 900 is outside the rendering range when the scale 900 of the lower-edge graphic scale 705 or the left-edge graphic scale 708 is outside the rendering range has been described above. This makes it easier for the operator to ascertain the state of the current shift amount from the lower-edge graphic scale 705.

According to the embodiment described above, the adjustment parameters are automatically set by matching the appearance of the print result of the test page with the preview on the adjustment screen, so that the operator can adjust the print position of the image more easily.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068839 filed Mar. 29, 2019, which is hereby incorporated by reference herein in its entirety.

What is claimed is:

1. An information processing apparatus which is able to communicate with a printing apparatus, the information processing apparatus comprising:
   a communication interface that transmits, to the printing apparatus, a print instruction for printing a predetermined scale on a sheet;
   a display that displays an image of the sheet and the predetermined scale;
   a display controller that shifts a display position of the predetermined scale on the displayed image of the sheet in accordance with an instruction from a user; and
   a controller that sets, based on the display position of the predetermined scale on the displayed image of the sheet, a value used for determining a printing position where the printing apparatus prints an image onto another sheet,
   wherein the communication interface transmits, to the printing apparatus, the value set by the controller.

2. The information processing apparatus according to claim 1, wherein the communication interface transmits the print instruction for printing a predetermined image including the predetermined scale.

3. The information processing apparatus according to claim 2,
   wherein the predetermined image is stored in the image forming apparatus.

4. The information processing apparatus according to claim 1,
   wherein the display further displays an object for shifting the display position of the predetermined scale in the displayed image of the sheet.

5. The information processing apparatus according to claim 1, wherein the display further displays identification information for indicating which section of the sheet is being displayed.

6. The information processing apparatus according to claim 5,
wherein the identification information indicates a first side of the sheet or a second side of the sheet.

7. The information processing apparatus according to claim 1, wherein a plurality of predetermined scales is displayed,
wherein the plurality of predetermined scales are displayed on both a long edge of the sheet and a short edge of the sheet.

8. The information processing apparatus according to claim 1, wherein the display further displays a message for prompting the user to shift the predetermined scale based on a result obtained by the printing apparatus printing the predetermined scale.

9. The information processing apparatus according to claim 1, wherein the display displays information indicating that the predetermined scale is outside a display region if the predetermined scale is partially or entirely shifted outside the display region.

10. The information processing apparatus according to claim 1, wherein the instruction is performed by dragging an image including the predetermined scale.

11. The information processing apparatus according to claim 4, wherein the instruction is performed by selecting the displayed object.

12. A system comprising:
a printer that prints a predetermined scale on a sheet;
a display that displays an image of the sheet and the predetermined scale;
a display controller that shifts a display position of the predetermined scale on the displayed image of the sheet in accordance with an instruction from a user; and
a controller that sets, based on the display position of the predetermined scale on the displayed image of the sheet, a printing position where the printer prints an image onto another sheet.

13. The system according to claim 12, wherein the instruction is performed by dragging the image of the sheet.

14. The system according to claim 12, wherein the instruction is performed by selecting an object for shifting the image of the sheet.

15. An information processing apparatus which is able to communicate with a printing apparatus, the information processing apparatus comprising:
a communication interface that transmits, to the printing apparatus, a print instruction for printing a predetermined scale on a sheet;
a display that displays an image of the sheet and the predetermined scale;
a controller that sets, based on an instruction from a user, a value used for determining a printing position where the printing apparatus prints an image onto another sheet, a distance from the image to a certain edge of the another sheet changing based on the set value; and
a display controller that shifts, based on the set value, display of the predetermined scale on the displayed image of the sheet,
wherein the communication interface transmits, to the printing apparatus, the set value.

16. The information processing apparatus according to claim 15, wherein the instruction is input of the value by the user.

17. The information processing apparatus according to claim 15,
wherein the display further displays an object for shifting the display of the predetermined scale in the displayed image of the sheet,
wherein the instruction is selection of the displayed object.

18. The information processing apparatus according to claim 15, wherein the instruction is a drag operation of the displayed image by the user.

19. The information processing apparatus according to claim 15, wherein the communication interface transmits the print instruction for printing a predetermined image including the predetermined scale.

20. The information processing apparatus according to claim 19,
wherein the predetermined image is stored in the image forming apparatus.

21. The information processing apparatus according to claim 15, wherein the display further displays identification information for indicating which section of the sheet is being displayed.

22. The information processing apparatus according to claim 21,
wherein the identification information indicates a first side of the sheet or a second side of the sheet.

23. The information processing apparatus according to claim 15, wherein a plurality of predetermined scales is displayed,
wherein the plurality of predetermined scales are displayed on both a long edge of the sheet and a short edge of the sheet.

24. The information processing apparatus according to claim 15, wherein the display further displays a message for prompting the user to shift the predetermined scale based on a result obtained by the printing apparatus printing the predetermined scale.

25. The information processing apparatus according to claim 15, wherein the display displays information indicating that the predetermined scale is outside a display region if the predetermined scale is partially or entirely shifted outside the display region.

26. A system comprising:
a printer that prints a predetermined scale on a sheet;
a display that displays an image of the sheet and the predetermined scale;
a controller that sets, based on an instruction from a user, a value used for determining a printing position where the printer prints an image onto another sheet, a distance from the image to a certain edge of the another sheet changing based on the set value; and
a display controller that shifts, based on the set value, display of the predetermined scale on the displayed image of the sheet.

27. The system according to claim 26, wherein the instruction is input of the value by the user.

28. The system according to claim 26,
wherein the display further displays an object for shifting the display of the predetermined scale in the displayed image of the sheet,
wherein the instruction is selection of the displayed object.

29. A method for controlling an information processing apparatus which is able to communicate with a printing apparatus, the method comprising:
transmitting, to the printing apparatus, a print instruction for printing a predetermined scale on a sheet;
displaying an image of the sheet and the predetermined scale;

shifting a display position of the predetermined scale on the displayed image of the sheet in accordance with an instruction from a user;

setting, based on the display position of the predetermined scale on the displayed image of the sheet, a value used for determining a printing position where the printing apparatus prints an image onto another sheet; and transmitting the set value to the printing apparatus.

30. A non-transitory computer readable medium storing a program causing a computer which is able to communicate with a printing apparatus to execute a process, the process comprising:

transmitting, to the printing apparatus, a print instruction for printing a predetermined scale on a sheet;

displaying an image of the sheet and the predetermined scale;

shifting a display position of the predetermined scale on the displayed image of the sheet in accordance with an instruction from a user;

setting, based on the display position of the predetermined scale on the displayed image of the sheet, a value used for determining a printing position where the printing apparatus prints an image onto another sheet; and transmitting the set value to the printing apparatus.

\* \* \* \* \*